(12) United States Patent
Juncker et al.

(10) Patent No.: US 8,260,610 B2
(45) Date of Patent: Sep. 4, 2012

(54) VAMOS—DARP RECEIVER SWITCHING FOR MOBILE RECEIVERS

(75) Inventors: Carsten Juncker, Herlev (DK); Morten With Pedersen, Frederiksberg (DE)

(73) Assignee: Nokia Corporation, Espoo (FI)

( * ) Notice: Subject to any disclaimer, the term of this patent is extended or adjusted under 35 U.S.C. 154(b) by 360 days.

(21) Appl. No.: 12/588,209

(22) Filed: Oct. 7, 2009

(65) Prior Publication Data

US 2011/0082689 A1   Apr. 7, 2011

(51) Int. Cl.
*G10L 19/14* (2006.01)
(52) U.S. Cl. ............ 704/221; 455/522; 370/431
(58) Field of Classification Search .......... 704/200–230; 455/522, 432.2, 69; 370/341, 431
See application file for complete search history.

(56) References Cited

U.S. PATENT DOCUMENTS

| | | | |
|---|---|---|---|
| 2004/0141572 A1* | 7/2004 | Johnson et al. | 375/350 |
| 2005/0136959 A1* | 6/2005 | Hellwig et al. | 455/522 |
| 2010/0203854 A1* | 8/2010 | Yu et al. | 455/127.1 |
| 2010/0279701 A1* | 11/2010 | Chen | 455/452.2 |

OTHER PUBLICATIONS

Raimund Meyer et al., "Efficient Receivers for GSM MUROS Downlink Transmission", IEEE, 2009, pp. 2399-2403.
Nokia Corporation, "Impact of DTX on VAMOS Level 2 Terminal Performance", 3GPP TSG GERAN #43, Aug. 31-Sep. 4, 2009, pp. 1-6.
Haipeng Lei et al., "Subchannel Interference Cancellation for Geran/Vamos Systems", Proceedings of ICCTA 2009, pp. 157-161.
International Search Report application No. PCT/IB2010/054543 dated Jan. 19, 2011.
3GPP TSG GERAN #43, "Impact of DTX on VAMOS Level 2 Terminal Peformance", GP-091214 7.1.5.10, Aug. 31-Sep. 4, 2009, pp. 1-6, Vancouver, Canada, Source: Nokia Corp.
Antipolis, Sophia, 3GPP GERAN WG1 Ad-hoc Meeting, "Impact of DXT on VAMOS Level 2 Terminal Performance", AHG1-090002, Oct. 19-21, 2009, pp. 1-6.
3GPP TS 45.001 V9.0.0 (May 2009), "3rd Generation Partnership Project; Technical Specification Group GSM/EDGE, Radio Access Network; Physical layer on the radio path; General description" (Release 9), pp. 1-43.
3GPP TS 45.002 V9.0.0 (May 2009), "3rd Generation Partnership Project; Technical Specification Group GSM/EDGE, Radio Access Network; Multiplexing and multiple access on the radio path" (Release 9), pp. 1-105.

\* cited by examiner

*Primary Examiner* — Abul Azad
(74) *Attorney, Agent, or Firm* — Squire Sanders (US) LLP

(57) ABSTRACT

Embodiments of the invention include apparatuses, systems, computer readable media, and methods for processing speech signals in a manner that enhances capacity, efficiency and hardware utilization of a communications network. A method, according to one embodiment, includes receiving speech signals, determining a subchannel power imbalance ratio of at least two subchannels, and selecting a receiver architecture for processing the speech signals in accordance with the determined subchannel power imbalance ratio.

24 Claims, 23 Drawing Sheets

VAMOS—DARP RECEIVER SWITCHING FOR MOBILE RECEIVERS

BACKGROUND

1. Field

Embodiments of the invention relate to communication systems and, in particular, to apparatuses, methods, and systems for receiving voice and/or data signals in a mobile or wireless communications network.

2. Description of the Related Art

Mobile communication network nodes, such as user equipment, mobile stations, and base transceiver stations, utilize receivers and/or transceivers to receive, transmit, and/or process data or speech signals.

The Global System for Mobile Communications (GSM) is one of the most common standards for regulating the transfer of data or speech signals between a user equipment and base stations in a mobile communications network. In a GSM network, data is transferred between the user equipment and the base stations as a radio signal over a physical channel which may use frequency and/or time division multiplexing to create a sequence of radio frequency channels and time slots. Each frequency band is divided into time division multiple access frames with, for example, 8 users per frame. Each user is allocated time to send a single burst of information. The user equipment and base station which are in communication may use different frequency bands.

GSM can, in some implementations, use Gaussian minimum shift keying (GMSK) modulation. GMSK is a continuous-phase frequency-shift keying modulation scheme. GMSK modulation uses the phase of the radio signal in order to transmit the data. The phase of the signal is dependent on the frequency of the signal. Such signals generally comprise a train of symbols equally spaced in time. Before the modulation each symbol takes one of two values, conventionally denoted +1 and −1. After GMSK modulation, the signals are comprised of complex valued samples each having an I (in-phase) and a Q (quadrature-phase) component. These signals may be received at an antenna and pre-processed by a front-end section of the receiver. The pre-processing involves amplification and basic filtering. The signal is then sampled at a multiple of the symbol frequency to form a train of complex samples. The samples are then demodulated to form a train of symbol estimates. The symbol estimates are used for further processing and for decoding of the information represented by the symbols.

An alternative phase modulation algorithm is quadrature phase shift keying (QPSK). Phase Shift Keying (PSK) is a digital modulation scheme that conveys data by changing, or modulating, the phase of a reference signal. As such, PSK is a form of phase modulation which is accomplished by the use of a discrete number of states. QPSK refers to PSK with four states or phases. With four phases, QPSK can encode two bits per symbol. Examples of QPSK include asynchronous QPSK (AQPSK), offset QPSK (OQPSK), and dual-polarization QPSK (DPQPSK).

Data and voice capacity of communication networks can be enhanced through the optimal selection of modulation techniques for receivers in the network.

SUMMARY

In one embodiment, an apparatus for processing speech signals is provided. The apparatus includes at least one processor, and at least one memory including computer program code. The at least one memory and the computer program code are configured, with the at least one processor, to cause the apparatus at least to receive speech signals, to determine a subchannel power imbalance ratio of at least two subchannels, and to select a receiver architecture to process the received speech signals in accordance with the determined subchannel power imbalance ratio. In one embodiment, the subchannel power imbalance ratio indicates the power allocation between two subchannels.

In another embodiment, a method of processing speech signals is provided. The method includes receiving speech signals, determining a subchannel power imbalance ratio of at least two subchannels, and selecting a receiver architecture for processing the speech signals in accordance with the determined subchannel power imbalance ratio.

In another embodiment, a computer program embodied on a computer readable medium is provided. The computer program is configured to control a processor to perform operations including receiving speech signals, determining a subchannel power imbalance ratio of at least two subchannels, and selecting a receiver architecture for processing the speech signals in accordance with the determined subchannel power imbalance ratio.

In another embodiment, an apparatus for processing speech signals is provided. The apparatus includes receiving means for receiving speech signals, determining means for determining a subchannel power imbalance ratio of at least two subchannels, and selecting means for selecting a receiver architecture for processing received speech signals in accordance with the determined subchannel power imbalance ratio.

BRIEF DESCRIPTION OF THE DRAWINGS

For proper understanding of the invention, reference should be made to the accompanying drawings, wherein.

DETAILED DESCRIPTION

Figure 1:
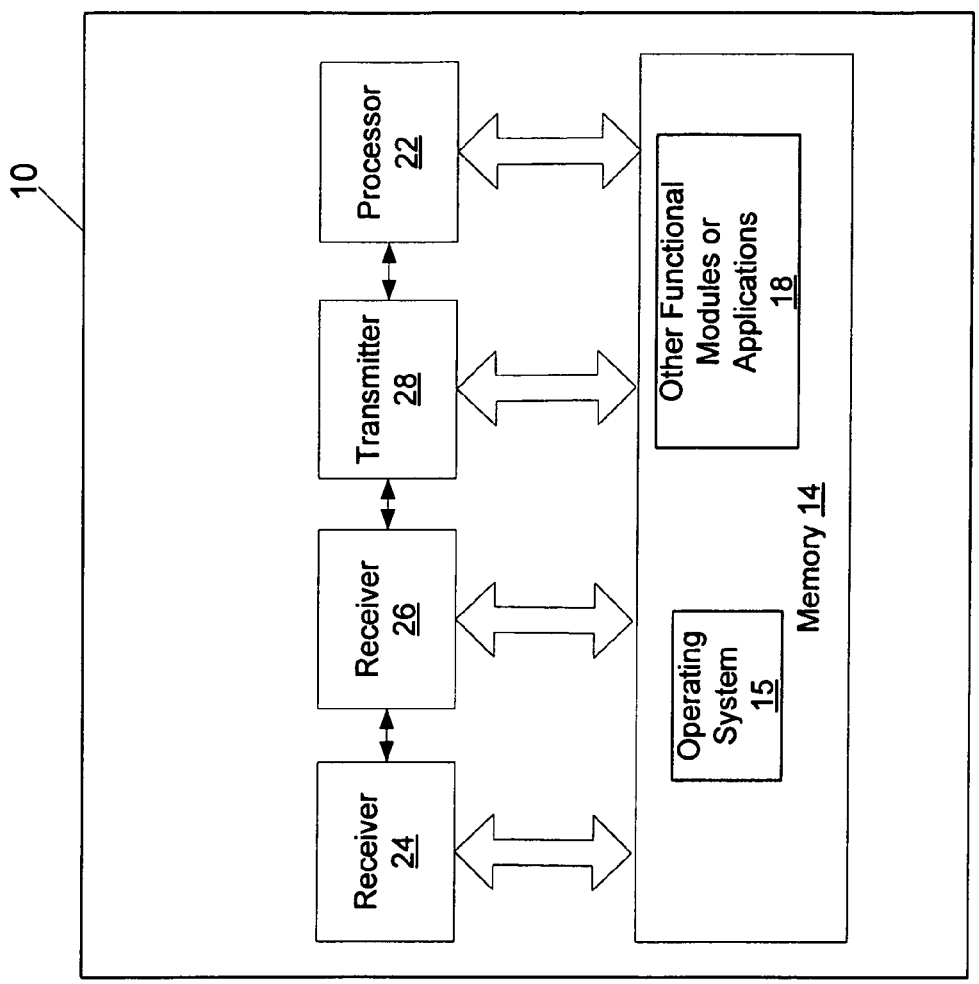
FIG. 1 illustrates an apparatus according to an embodiment of the invention.

Embodiments of the invention include apparatuses, systems, computer readable media, and methods for processing speech signals in a manner that enhances capacity, efficiency and hardware utilization of the communications network. Under the $3^{rd}$ Generation Partnership Project (3GPP) release 9, a new GSM feature referred to as Voice services over Adaptive Multi-user Orthogonal Sub channels (VAMOS) is specified in an effort to provide voice capacity enhancements. The 3GPP TS 45.001 V9.0.0 (2009-05) and 3GPP TS 45.002 V9.0.0 (2009-05) technical specifications includes a description of VAMOS, and these specifications are hereby incorporated by reference in their entirety. VAMOS allows for the multiplexing of at least two users simultaneously on the same physical resource both in downlink and uplink, using the same timeslot number and frame number. As a result, a VAMOS capable physical channel supports up to four traffic channels along with their associated control channels.

VAMOS improves both network capacity and hardware efficiency by, for example, enabling more users per carrier. In particular, these gains may include more users per transceiver (TRx), while VAMOS can co-exist with legacy terminals supporting single antenna interference cancellation (SAIC) or downlink advanced receiver performance (DARP) since these may cancel the 2nd VAMOS user.

The 3GPP prescribes two mobile station (MS) support levels for VAMOS. A mobile station or terminal supporting VAMOS should support a new set of GSM training sequence codes (TSCs) and may be based on either DARP Phase I or an advanced receiver architecture. Hence, two different terminal support levels will be specified for VAMOS aware terminals. VAMOS level I terminals are essentially DARP phase I terminals updated to support the new VAMOS TSC set. VAMOS Level II terminals include a more advanced receiver fulfilling some tightened 3GPP performance requirements. VAMOS aware terminals will have to indicate their support level to the network in order for the network to exploit the capacity to the highest extent.

One reason for the 3GPP to specify both VAMOS level I and VAMOS level II terminals is in order to enable mobile vendors to implement VAMOS support in the terminals at an early point in time. For VAMOS level II, hardware changes may be required in order to obtain terminals with a significantly improved L1 performance (when operating in a VAMOS network).

In order to be able to fulfill the tightened 3GPP performance requirements for the VAMOS level II terminals, significant changes may be required to the terminal receiver architecture for this particular mode of operation for GSM voice. These VAMOS optimized terminal receiver architectures are likely to have limited compatibility with the existing GSM voice services (GSM speech and AMR) which is GMSK modulated voice services. The limited compatibility to the existing GSM voice services is experienced in terms of degraded L1 performance, i.e., degraded voice quality for the end users.

The compatibility problem may be evident at least with the following network configurations: 1) VAMOS level II terminals operating in networks where operators have not deployed VAMOS; 2) VAMOS level II terminals operating in VAMOS networks where operators have mixed VAMOS and traditional GSM speech services; 3) VAMOS level II terminals operating in VAMOS mode but where the second VAMOS user enters DTX; and 4) A VAMOS level II terminal operating in a VAMOS network with a Sub-Channel Power Imbalance Ratio (SCPIR) sufficiently high to make the impact from the second VAMOS sub-channel insignificant.

Therefore, embodiments of the present invention ensure that the performance of a VAMOS level II terminal operating in any of the four network configurations listed above is on par with the current DARP phase I performance.

A VAMOS level II receiver based on joint detection may be, for example, a receiver utilizing both the signal for the desired subchannel and the signal for the second VAMOS subchannel for estimation and equalization. In the four network scenarios outlined above, where the second VAMOS sub-channel is not present or has a very small fraction of the transmitted power assigned to it (i.e., SCPIR is high), the performance of the VAMOS level II terminal (based on QPSK) may be worse than the performance of the current DARP phase I receiver, which is used for the traditional GSM voice services that are GMSK modulated.

Embodiments of the present invention combine the good performance of the current DARP phase I receiver for a high-value subchannel power imbalance ratio (SCPIR) with the good performance of the VAMOS level II receiver for a medium-to-low valued subchannel power imbalance ratio (SCPIR). The subchannel power imbalance ratio (SCPIR) indicates the relative power allocation between the two subchannels.

In an embodiment, the SCPIR is detected on a burst-by-burst basis and that information is used to switch between the VAMOS level II receiver architecture (based on QPSK) and the current DARP phase I receiver architecture (based on GMSK) from burst to burst. More specifically, according to one example, when the SCPIR for a burst is detected to be infinite or above a certain threshold value, then the current DARP phase I receiver architecture is used for that burst even though the network might be operating in VAMOS mode. If, however, the SCPIR is detected to be below the threshold value then the VAMOS level II receiver architecture (based on QPSK) is used for that burst. Thus, embodiments of the invention allow for optimal receiver performance for all SCPIR levels.

According to certain embodiments, the receiver selection and SCPIR estimation is performed in the front-end, that is, after the RF. As a result, in one example, switching between the receivers refers to switching between the receiver processing done after the RF and onwards. Accordingly, the VAMOS level II and DARP phase I receivers may share the same RF, but have differences in their baseband processing.

FIG. 1 illustrates an apparatus 10 for receiving and processing speech signals in accordance with an embodiment of the invention. Apparatus 10 includes a processor 22 for processing information and executing instructions or operations. Processor 22 may be any type of general or specific purpose processor. While a single processor 22 is shown in FIG. 1, multiple processors may be utilized according to other embodiments.

Apparatus 10 further includes a memory 14, coupled to processor 22, for storing information and instructions to be executed by processor 22. Memory 14 can be comprised of any combination of random access memory ("RAM"), read only memory ("ROM"), static storage such as a magnetic or optical disk, or any other type of machine or computer readable media.

Apparatus 10 may further include a transmitter 28 for transmitting information, such as data, speech, and/or control signals. Apparatus 10 also includes receivers 24 and 26 for receiving information including data, speech and/or control signals. Although two receivers are illustrated in FIG. 1 by way of example, any number of receivers may be included in accordance with certain embodiments. In some embodiments, receivers 24 and 26 may be a GMSK receiver architecture, QPSK receiver architecture, alpha-QPSK (AQPSK) receiver architecture, DARP phase I compliant receiver architecture, and/or VAMOS level II compliant receiver architecture. In addition, in some examples, the receiver and transmitter functionality may be implemented in a single transceiver unit.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

Memory 14 and the computer program code stored thereon may be configured, with processor 22, to cause the apparatus to receive speech signals, determine a subchannel power imbalance ratio of at least two subchannels, and select an appropriate receiver architecture to process the received speech signals in accordance with the determined subchannel power imbalance ratio (SCPIR). In one embodiment, the selection of an appropriate receiver architecture includes selecting between a DARP phase I compliant receiver architecture and a VAMOS level II compliant receiver architecture. More specifically, according to one example, the DARP phase I compliant receiver architecture is selected to process the signals when the SCPIR is above a predetermined threshold or value. Alternatively, the VAMOS level II compliant receiver architecture may be selected to process the signals when the SCPIR is below the predetermined threshold or value.

According to some embodiments, apparatus 10 may be a user equipment, mobile station or terminal, such as a mobile telephone, smart phone, personal data assistant (PDA), laptop, netbook, or any other device capable of wireless communication.

Figure 13:
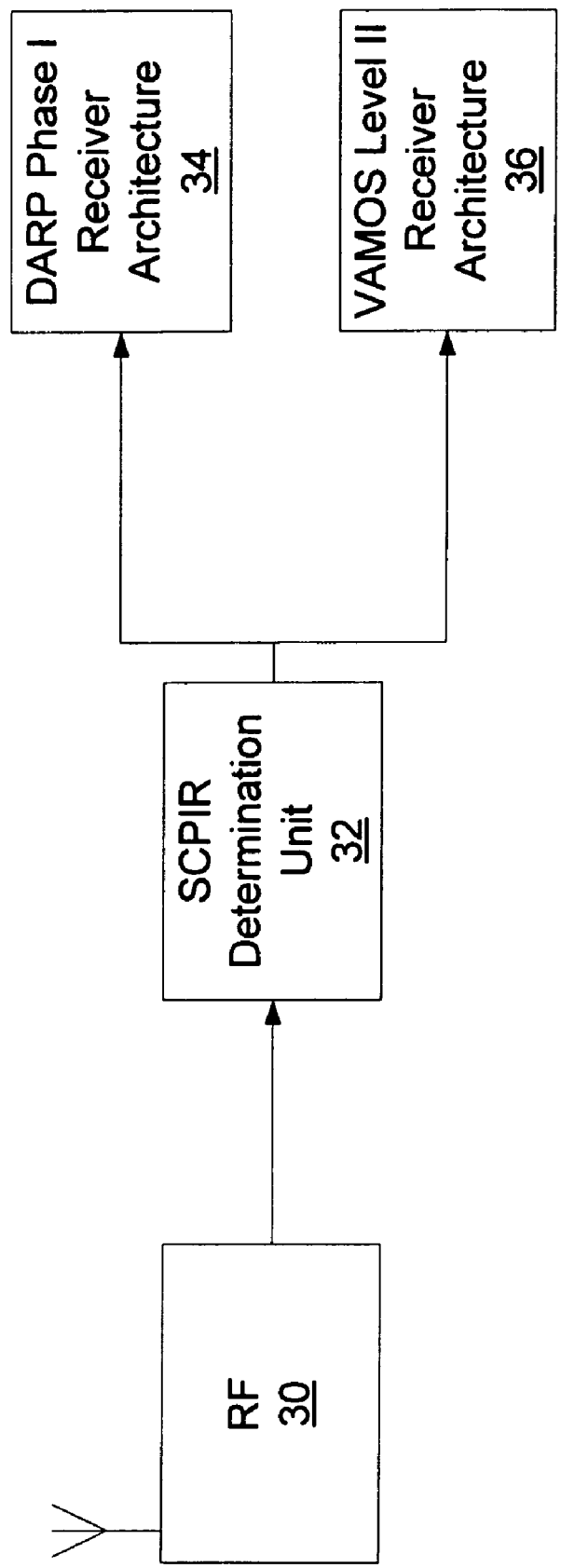
FIG. 13 illustrates a block diagram of a system according to an embodiment.

FIG. 13 illustrates a system in accordance with some embodiments of the invention. The system includes a radio frequency (RF) receiver or transceiver 30. The RF receiver or transceiver 30 may be an antenna for receiving a speech signal. In one embodiment, RF receiver 30 communicates a received speech signal to an SCPIR determination unit 32 that determines the SCPIR for the subchannels as discussed above. According to certain embodiments, SCPIR determination unit 32 may correspond to apparatus 10 or processor 22 outlined above. Based on the calculated subchannel power imbalance ratio, SCPIR determination unit 32 selects either DARP Phase I receiver architecture 34 or VAMOS level II receiver architecture 36 for processing the received speech signal.

According to certain embodiments, the selection or switching between receiver architectures based on the determined SCPIR is permanently enabled. In other embodiments, the selection of the receiver architecture to process the speech signal may be enabled or disabled during a call depending on the downlink signaling of VAMOS mode in a VAMOS capable network that the mobile terminal receives during that call. According to another embodiment, the mobile terminal may enable selection or switching between the receiver architectures based on the determined SCPIR from call to call, i.e. the switching mechanism is enabled only if the network has signaled during call setup that it is VAMOS capable.

Figure 2:
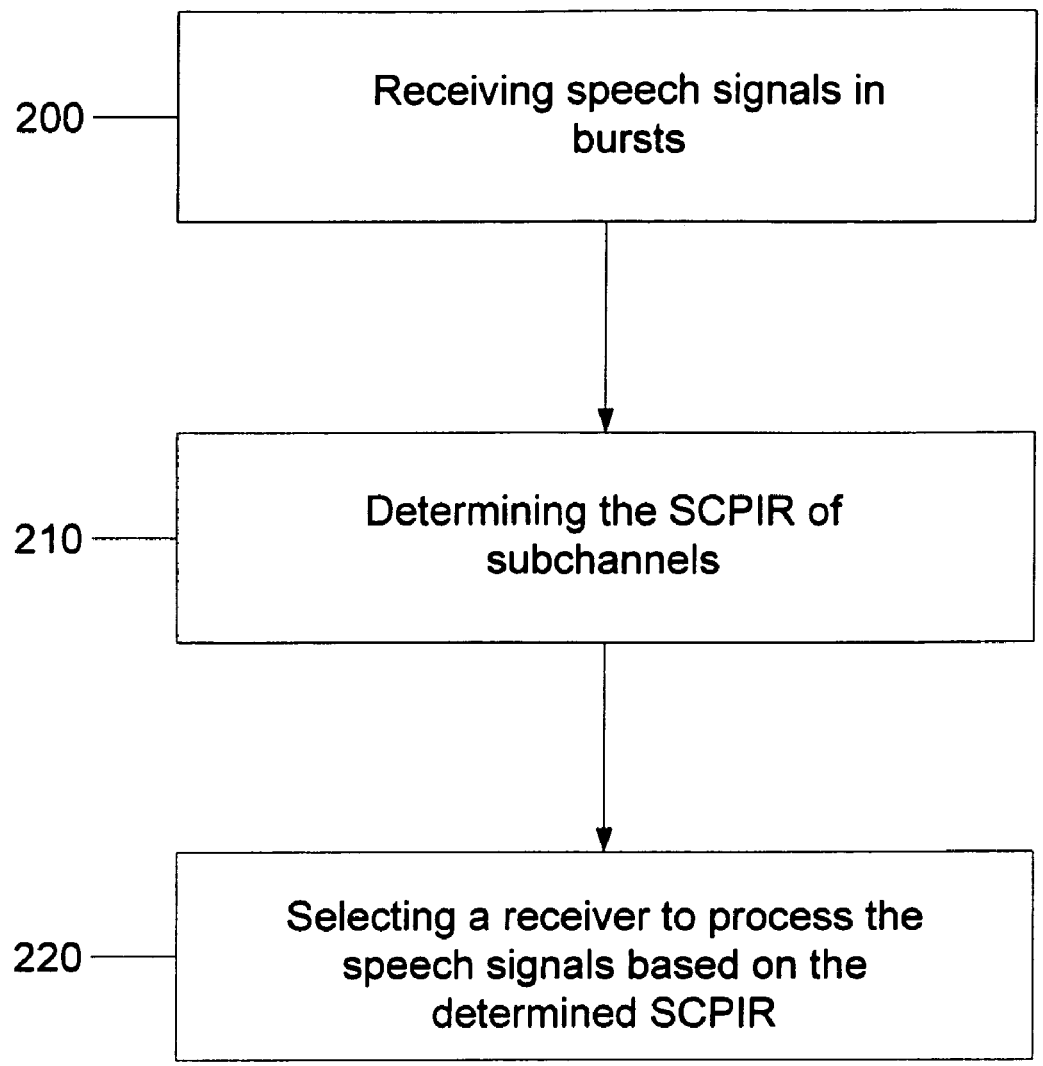
FIG. 2 illustrates a method according to an embodiment of the invention.

FIG. 2 illustrates a method for processing speech signals according to an embodiment of the invention. The method includes, at 200, receiving speech signals. The speech signals may be received in bursts. At 210, the subchannel power imbalance ratio (SCPIR) is determined. Then, at 220, a receiver architecture is selected to process the speech signals based on the determined SCPIR. The determination of the SCPIR and the selection of the receiver architecture may be performed for each of the bursts in which the speech signals are received. Further, in some embodiments, the speech signals may be VAMOS speech signals.

Additionally, in certain embodiments, selecting a receiver architecture to process the speech signals 220 may include selecting between a GMSK receiver architecture and a QPSK receiver architecture, such as an AQPSK receiver architecture. Thus, the selection may involve selecting between a DARP phase I compliant receiver architecture and a VAMOS level II compliant receiver architecture. According to one example, the DARP phase I compliant receiver architecture is selected to process the signals when the SCPIR is above a predetermined threshold or value; and the VAMOS level II compliant receiver architecture may be selected to process the signals when the SCPIR is below the predetermined threshold or value. In some embodiments, the speech signals to be processed include speech frames that can be received sequentially in bursts. The speech frames may include speech data and/or control data. Speech frames may include, for example, traffic channel (TCH), fast associated control channel (FACCH), and slow associated control channel (SACCH) frames in accordance with 3GPP TS 45.001. The bursts may be received through the different receiver architectures that are selected according to the determined SCPIR. In other words, the determination of which receiver architecture should be selected to process the received bursts may be performed for each of the bursts separately, and the bursts received by the different receiver architectures can then be combined into speech frames.

FIGS. 3-12 illustrate performance curves which show the performance difference, measured in raw bit error rate, between an AQPSK (VAMOS level II) and a DARP phase I receiver for various SCPIR levels in the transmitted signal and for various types of external interference (i.e., interference besides the other subchannel user).

Figure 3A:
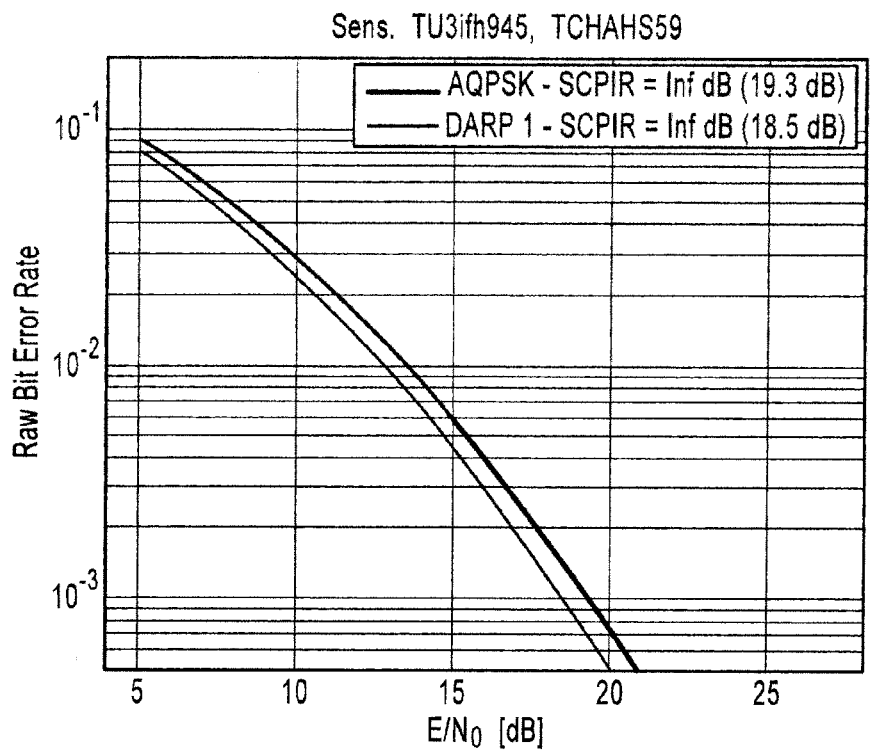
FIGS. 3a-3c illustrate sensitivity performance curves of receivers for various SCPIR levels in accordance with an embodiment.
Figure 3B:
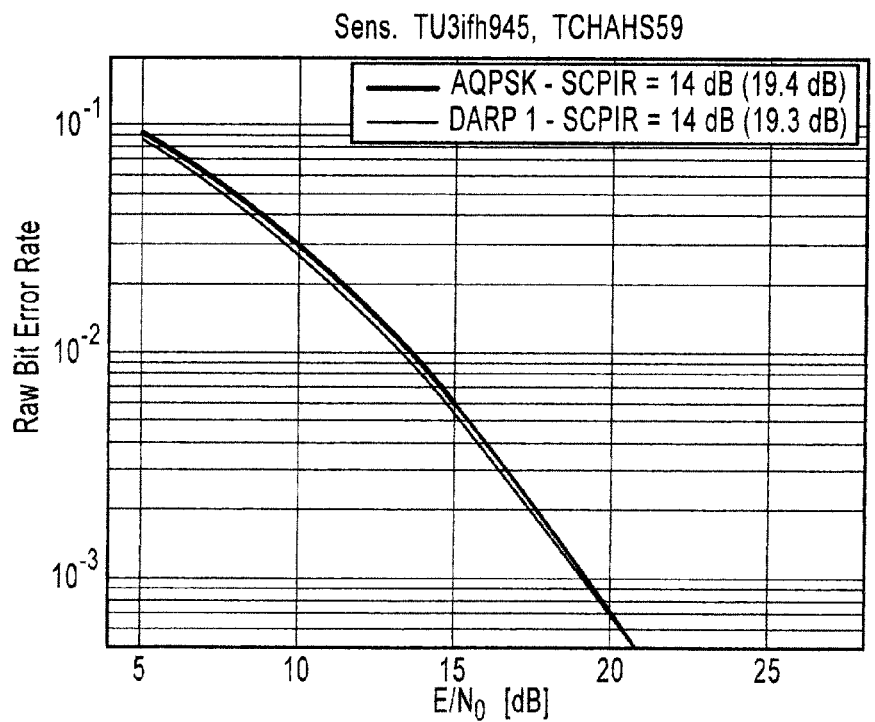
Figure 3C:
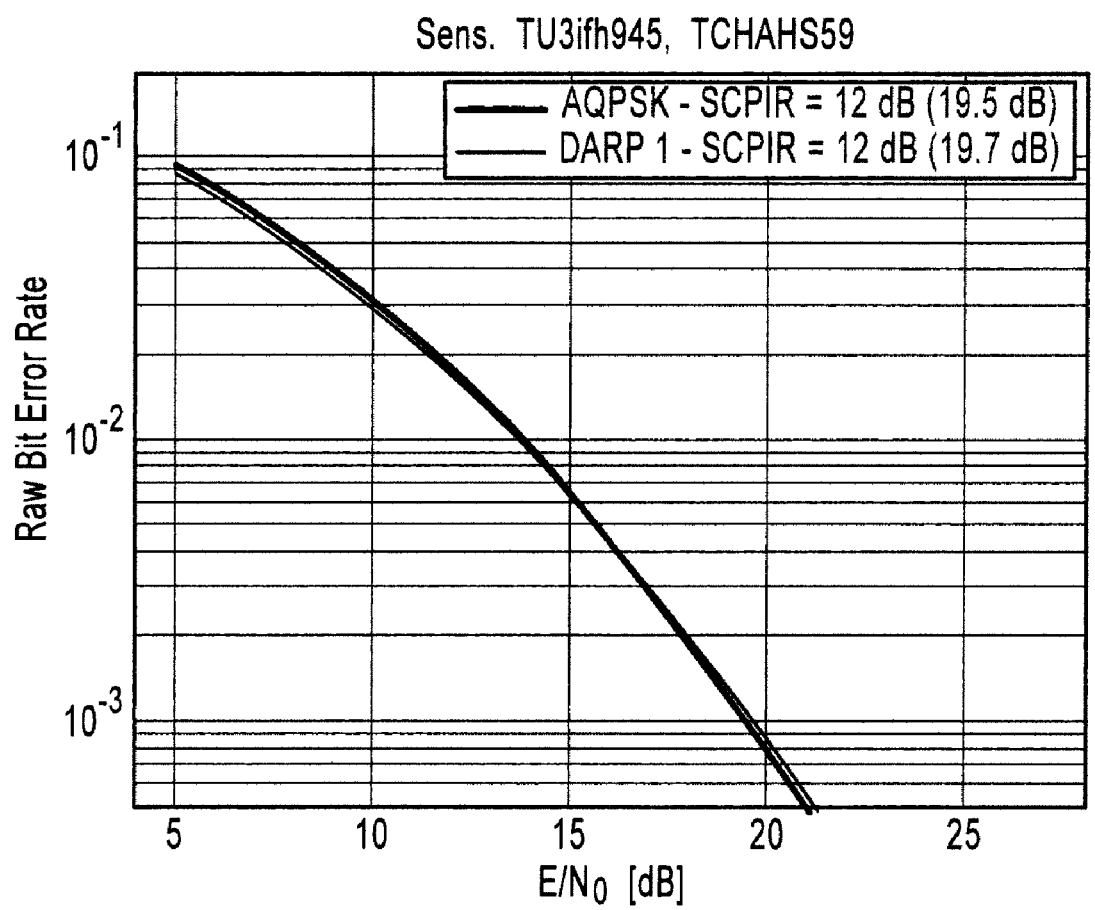

FIG. 3a illustrates the sensitivity performance of an APQSK receiver and a DARP phase I receiver with a SCPIR of infinity. As can be seen from FIG. 3a, for this SCPIR, the DARP phase I receiver provides better performance. FIG. 3b illustrates the performance of the receivers with a SCPIR of 14 db; FIG. 3c illustrates the performance of the receivers with a SCPIR of 12 db. FIGS. 3b and 3c show a similar level of performance for the APQSK and DARP phase I receivers at these SCPIR levels.

Figure 4A:
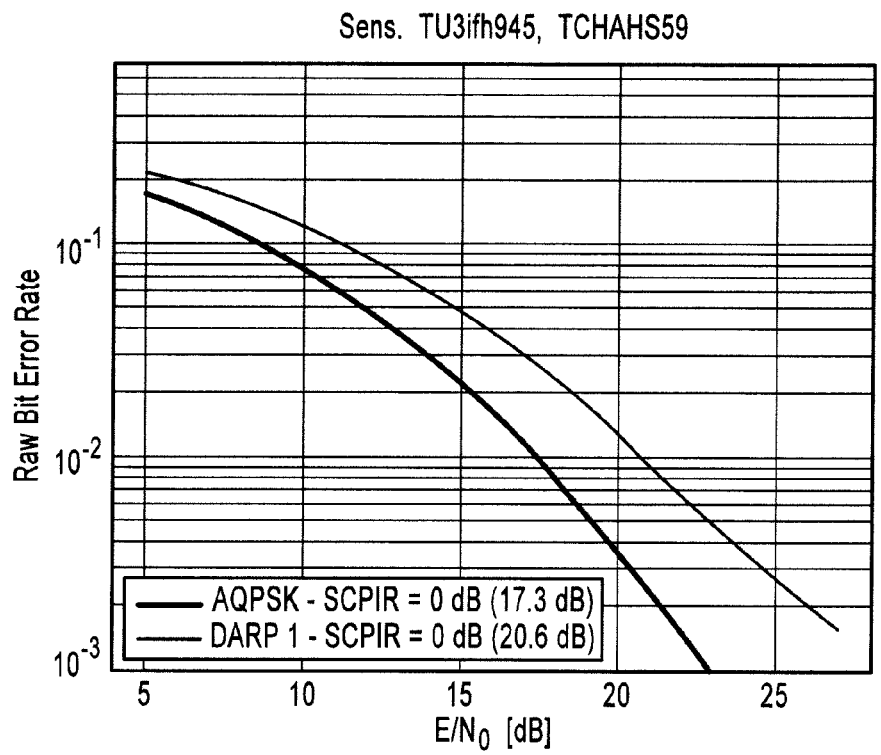
FIGS. 4a-4c illustrate sensitivity performance curves of receivers for various SCPIR levels in accordance with another embodiment.
Figure 4B:
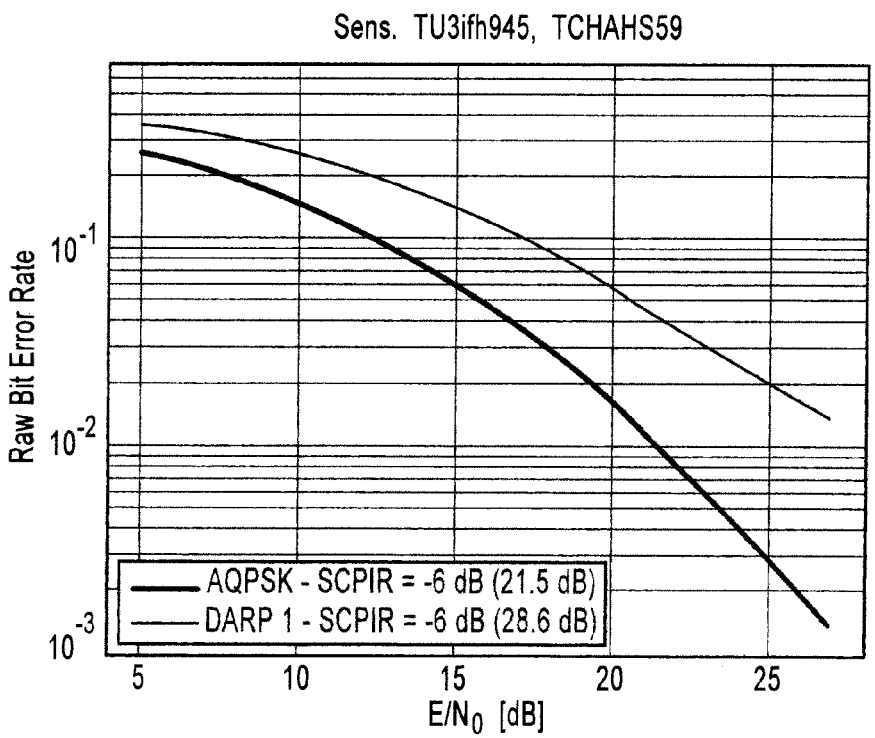
Figure 4C:
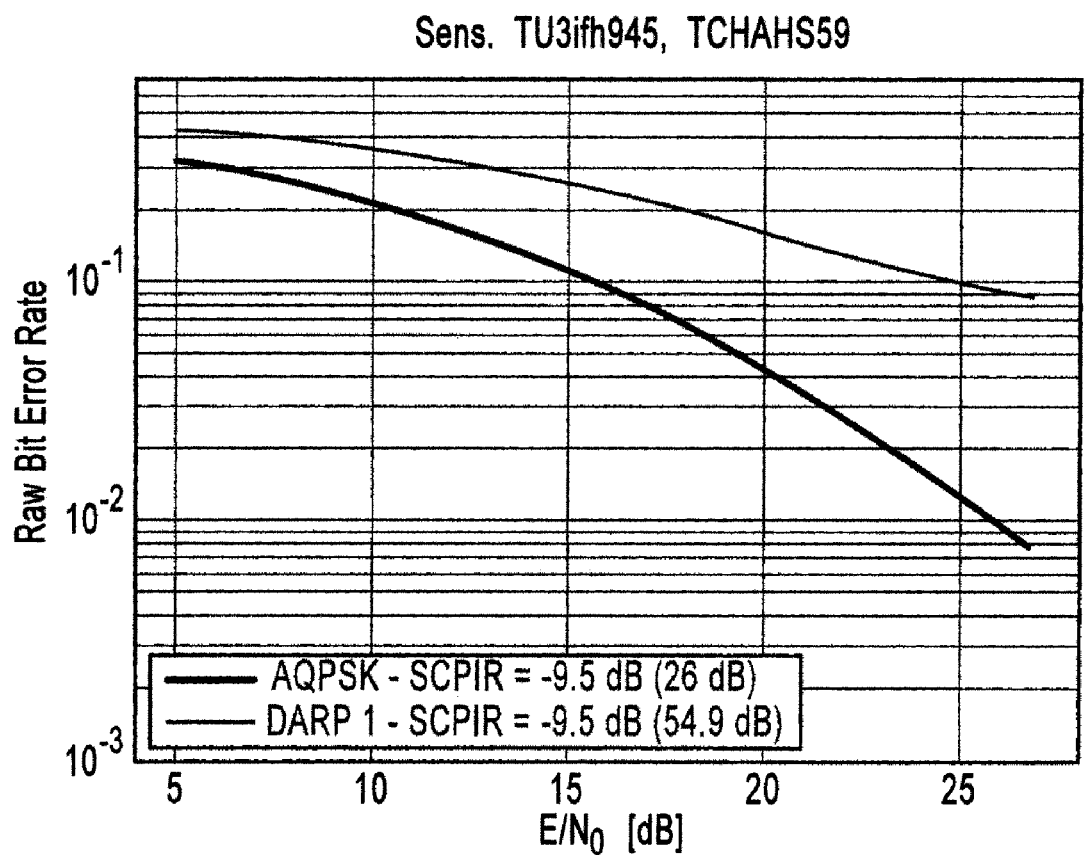

FIG. 4a illustrates the sensitivity performance of the APQSK receiver and the DARP phase I receiver with a SCPIR of 0 db. FIG. 4b illustrates the performance of the receivers with a SCPIR of −6 db, and FIG. 4c illustrates their performance with a SCPIR of −9.5 db. At these lower SCPIR levels shown in FIGS. 4a-c, the APQSK receiver outperforms the DARP phase I receiver.

Figure 5A:
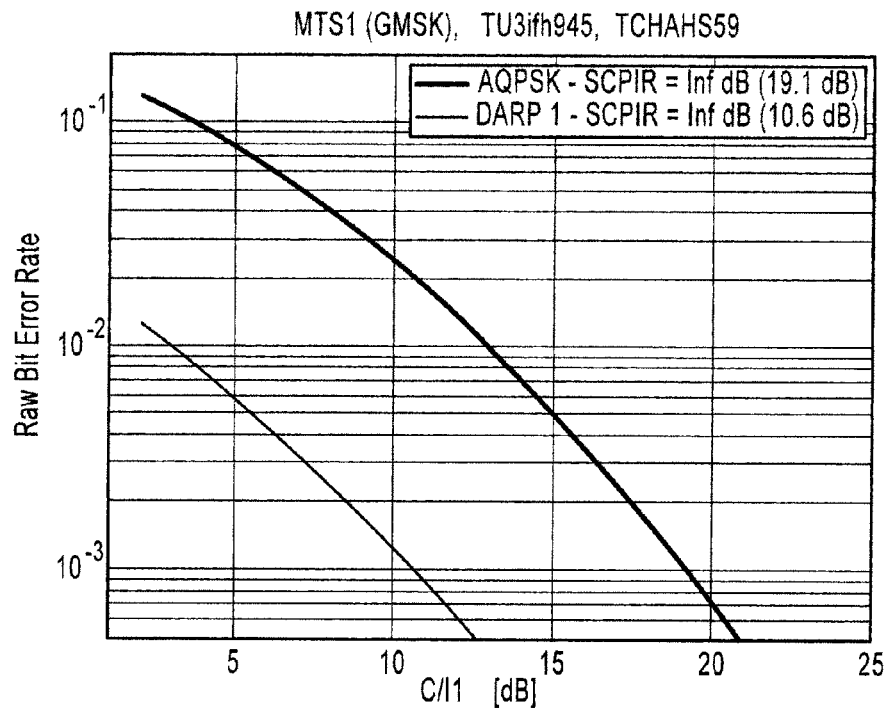
FIGS. 5a-5c illustrate performance curves of receivers for various SCPIR levels with a single co-channel interferer (MTS1) and GMSK external interference in accordance with an embodiment.
Figure 5B:
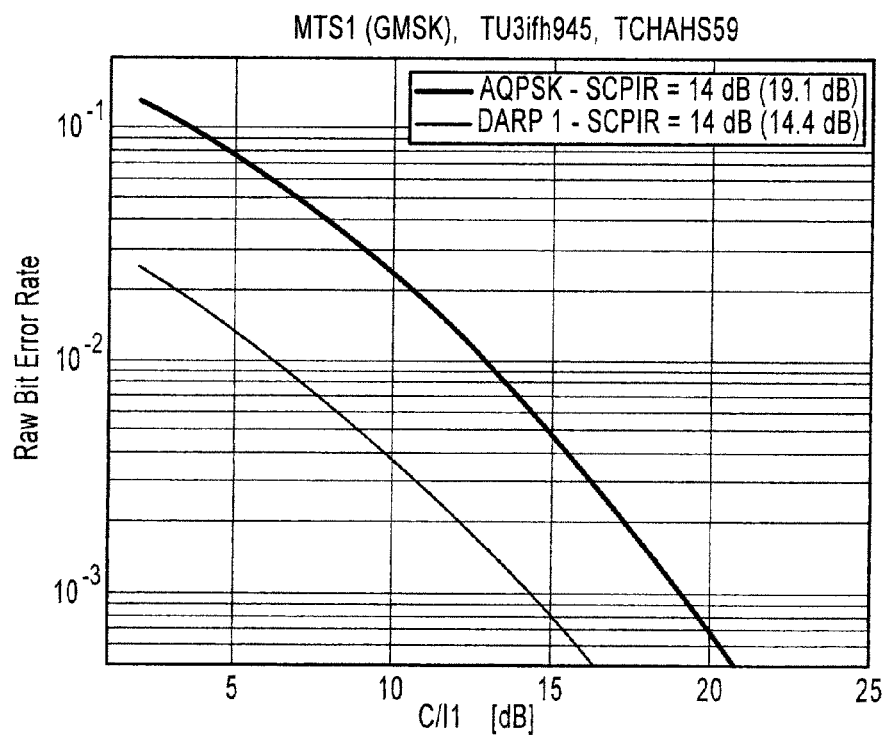
Figure 5C:
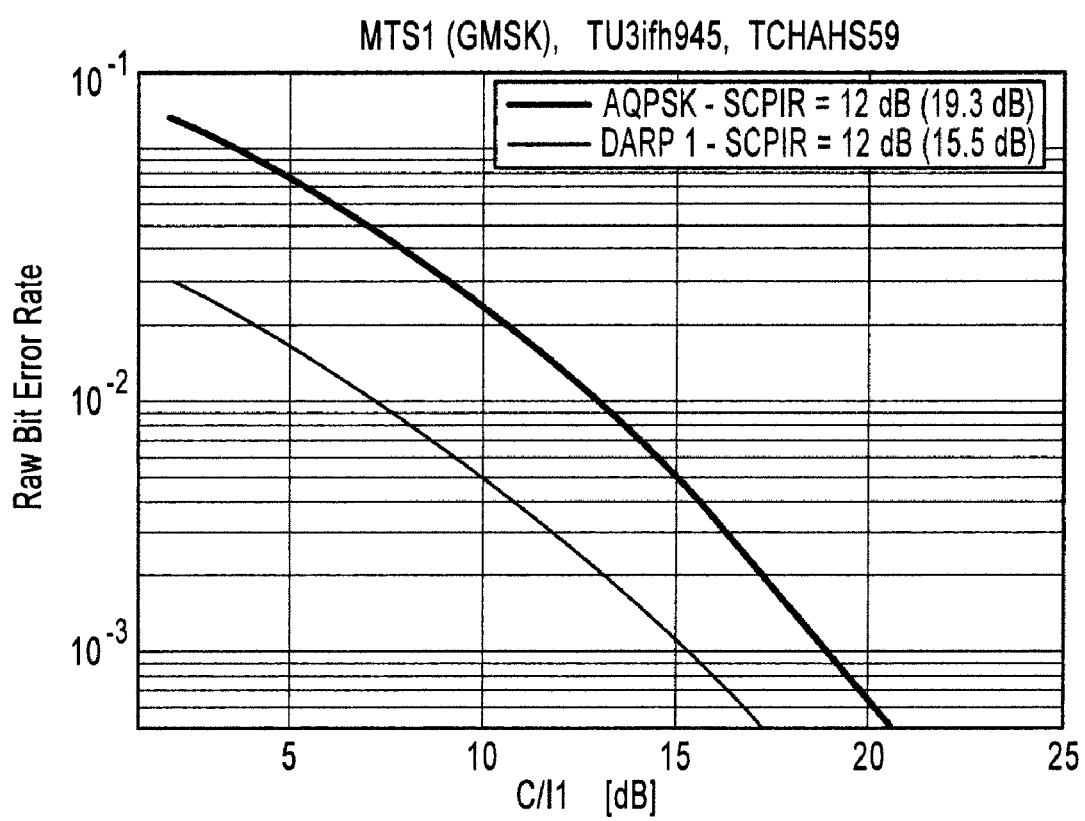

FIGS. 5a-c illustrate the performance of the APQSK receiver and the DARP phase I receiver with a single co-channel interferer (MTS1) and GMSK external interference. GMSK external interference generally reflects GSM voice and GSM GPRS users in the network. FIG. 5a illustrates the performance of the receivers where the SCPIR is infinity, FIG. 5b illustrates receiver performance with a SCPIR of 14 db, and FIG. 5c illustrates receiver performance with a SCPIR of 12 db.

Figure 6A:
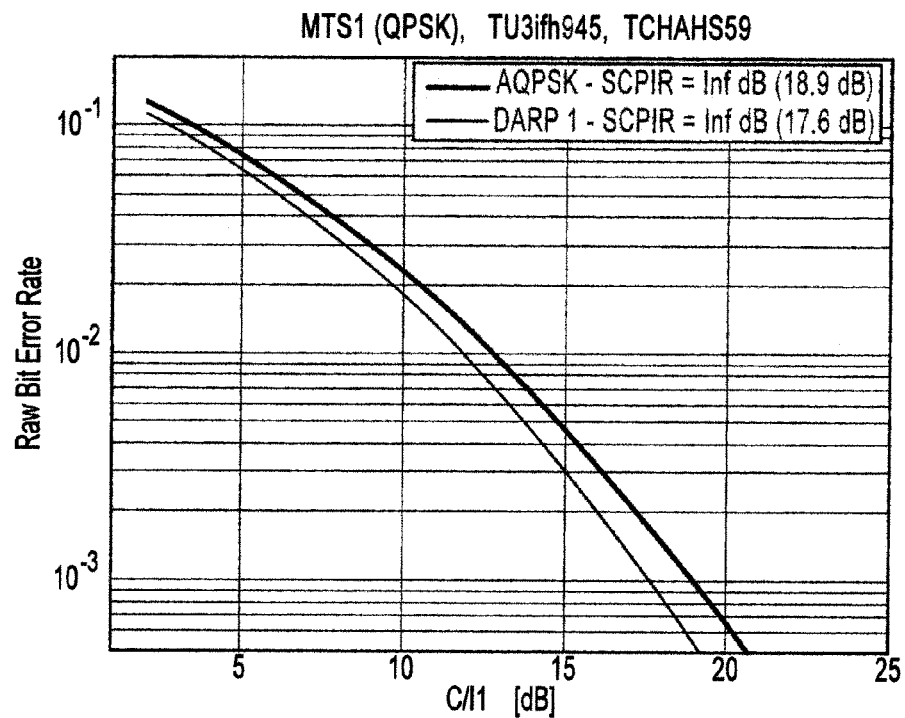
FIGS. 6a-6c illustrate performance curves of receivers for various SCPIR levels with a single co-channel interferer (MTS1) and QPSK external interference in accordance with an embodiment.
Figure 6B:
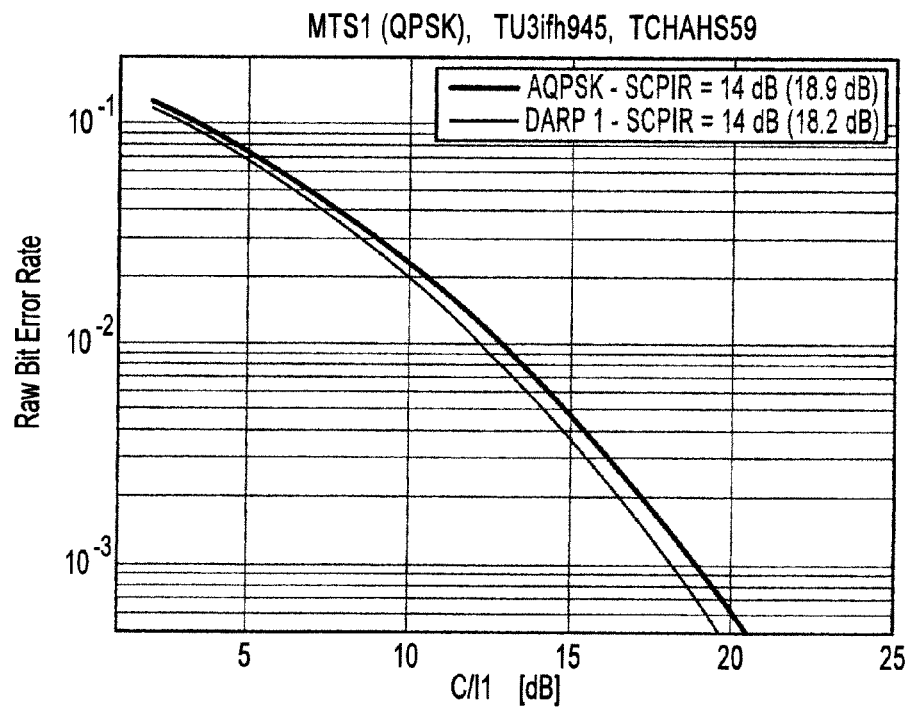
Figure 6C:
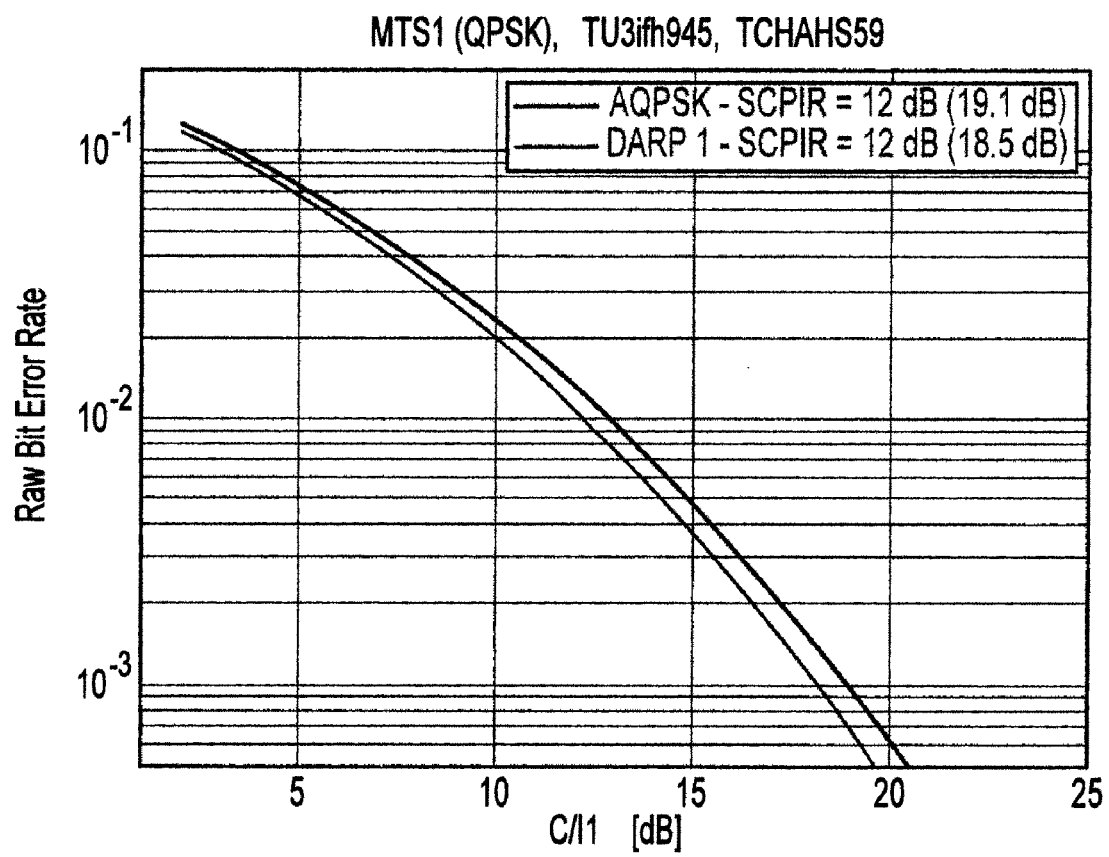

FIGS. 6a-c illustrate the performance of the APQSK receiver and the DARP phase I receiver with a single co-channel interferer (MTS1) and QPSK external interference. QPSK external interference generally reflects other VAMOS users in the network. FIG. 6a illustrates the performance of the receivers where the SCPIR is infinity, FIG. 6b illustrates receiver performance with a SCPIR of 14 db, and FIG. 6c illustrates receiver performance with a SCPIR of 12 db.

Figure 7A:
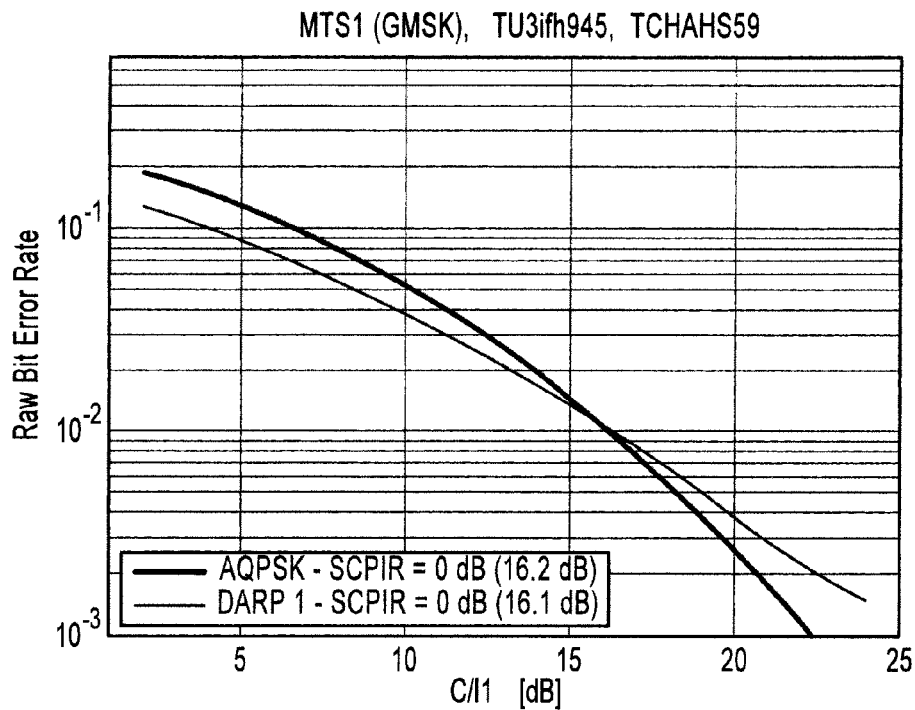
FIGS. 7a-7c illustrate performance curves of receivers for various SCPIR levels with a single co-channel interferer (MTS1) and GMSK external interference in accordance with an embodiment.
Figure 7B:
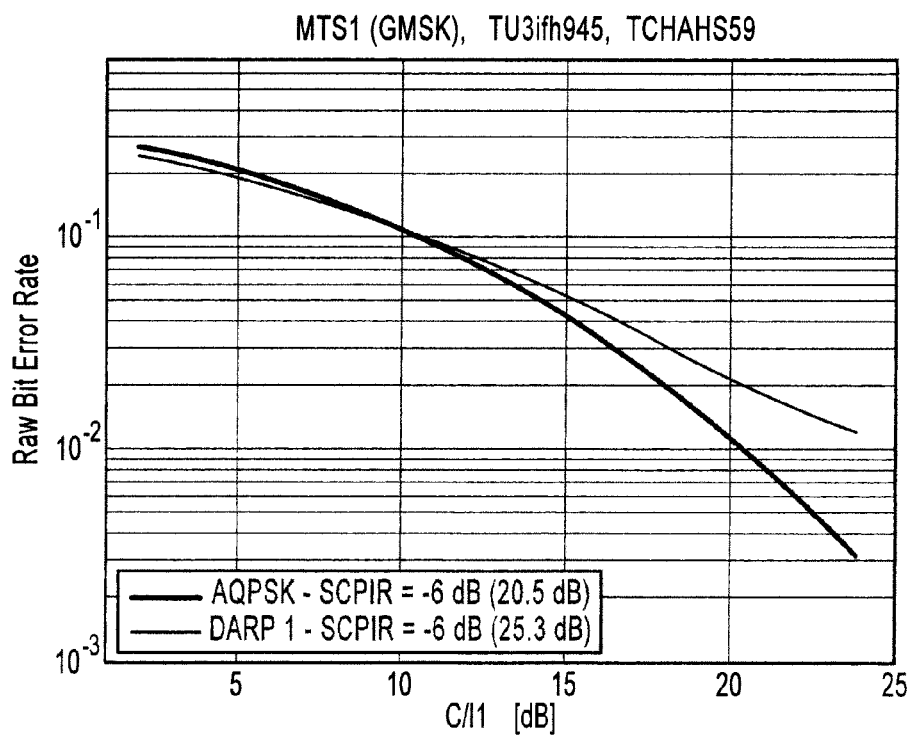
Figure 7C:
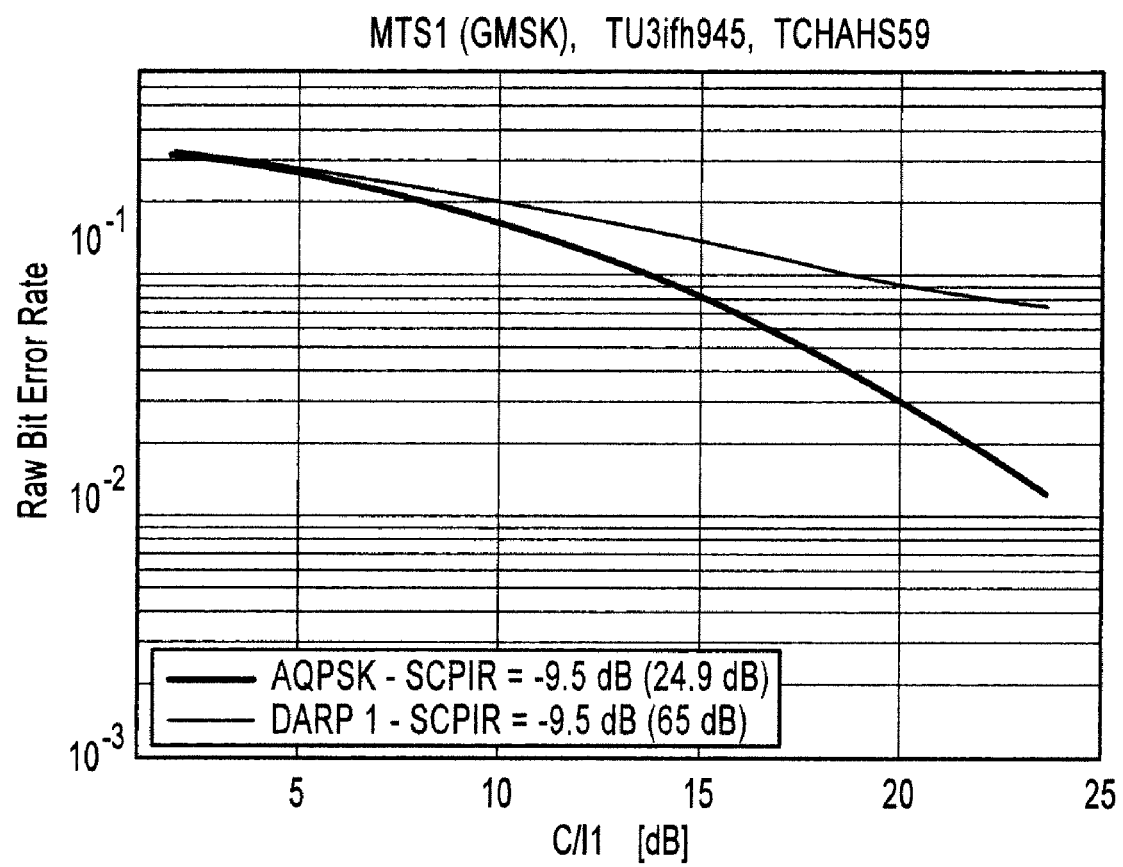

FIGS. 7a-c are similar to FIGS. 5a-c in that they illustrate the performance of the APQSK receiver and the DARP phase I receiver with a single co-channel interferer (MTS1) and GMSK external interference. However, unlike FIGS. 5a-c, FIG. 7a is directed to a SCPIR of 0 db, FIG. 7b is directed to a SCPIR of −6 db, and FIG. 7c is directed to a SCPIR of −9.5 db.

Figure 8A:
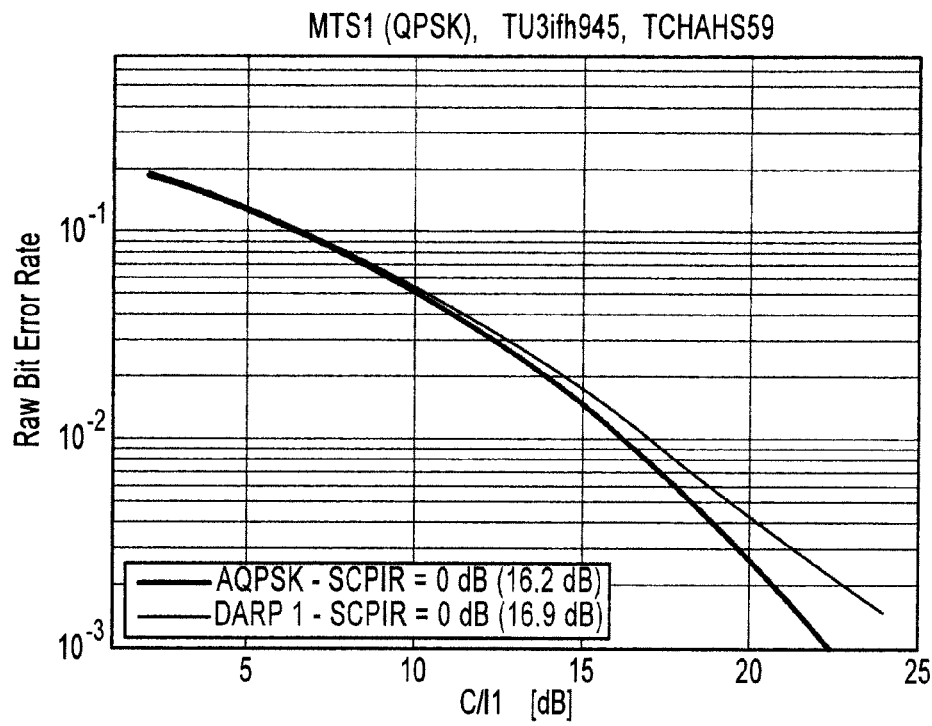
FIGS. 8a-8c illustrate performance curves of receivers for various SCPIR levels with a single co-channel interferer (MTS1) and QPSK external interference in accordance with an embodiment.
Figure 8B:
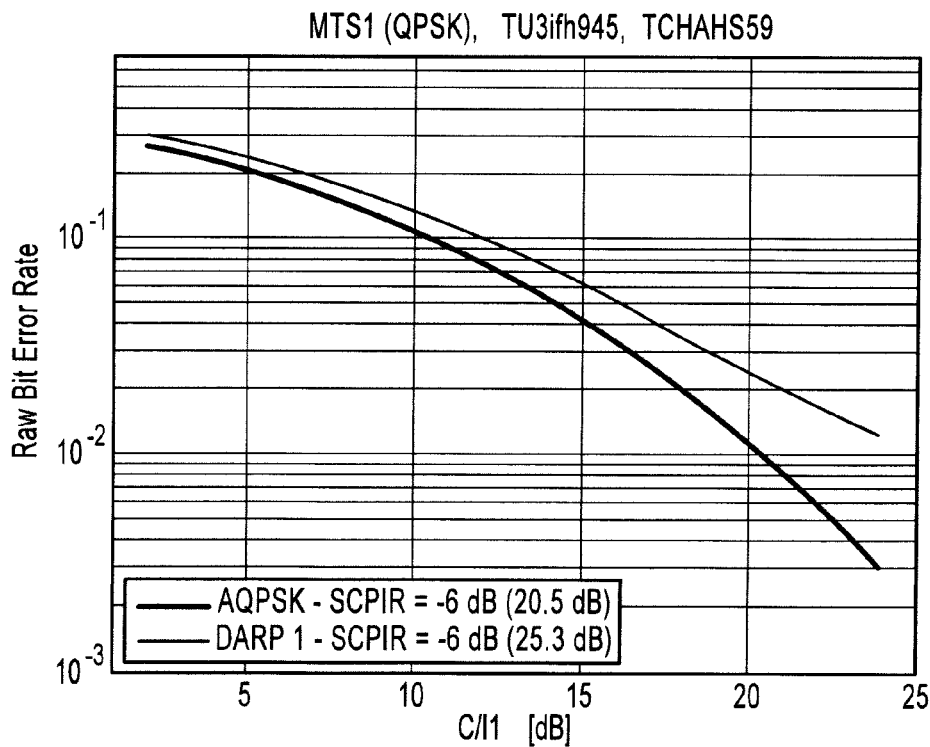
Figure 8C:
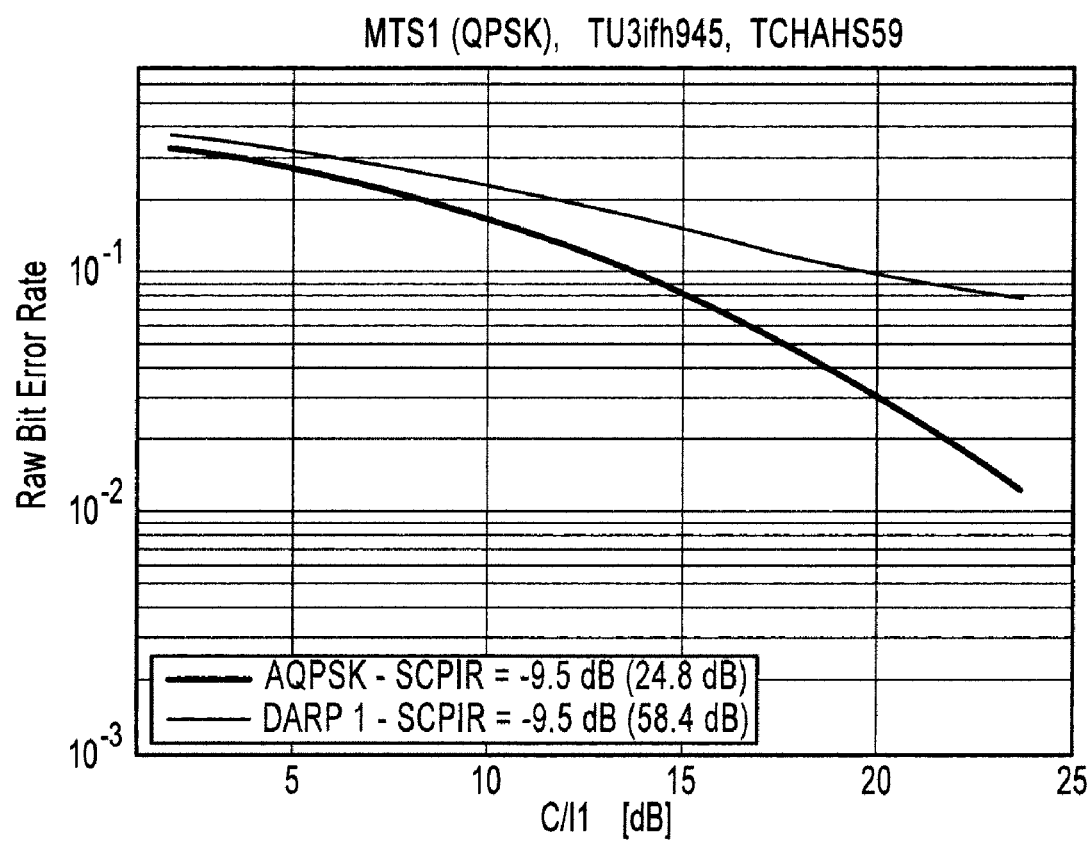

FIGS. 8a-c, similar to FIGS. 6a-c, illustrate the performance of the APQSK receiver and the DARP phase I receiver with a single co-channel interferer (MTS1) and QPSK external interference. However, FIG. 8a illustrates the performance of the receivers where the SCPIR is 0 db, FIG. 8b illustrates receiver performance with a SCPIR of −6 db, and FIG. 8c illustrates receiver performance with a SCPIR of −9.5 db.

Figure 9A:
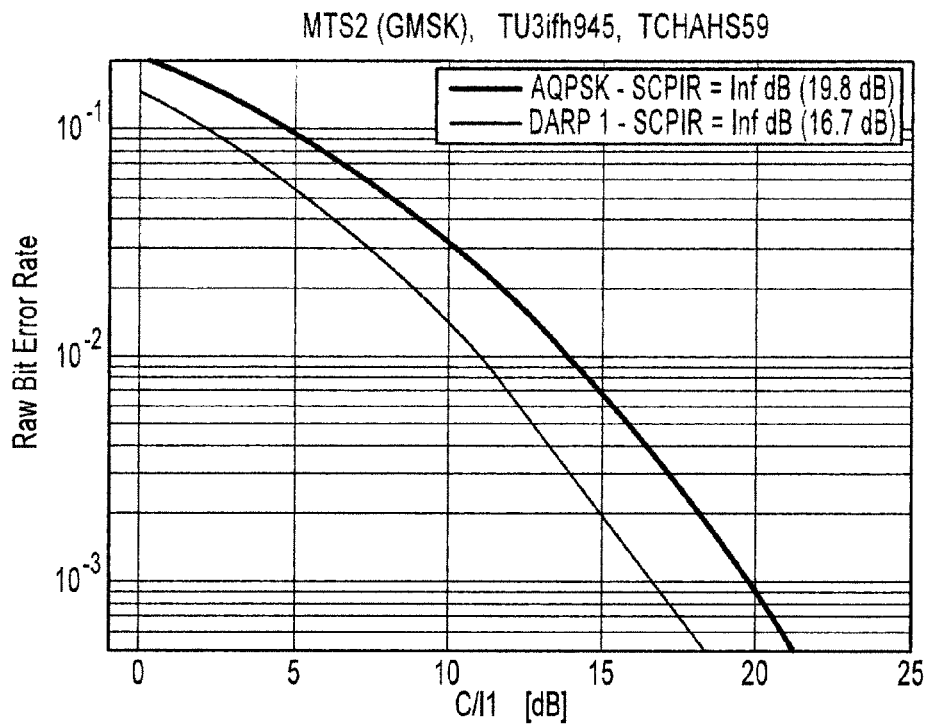
FIGS. 9a-9c illustrate performance curves of receivers for various SCPIR levels with multi-interference (MTS2) and GMSK external interference in accordance with an embodiment.
Figure 9B:
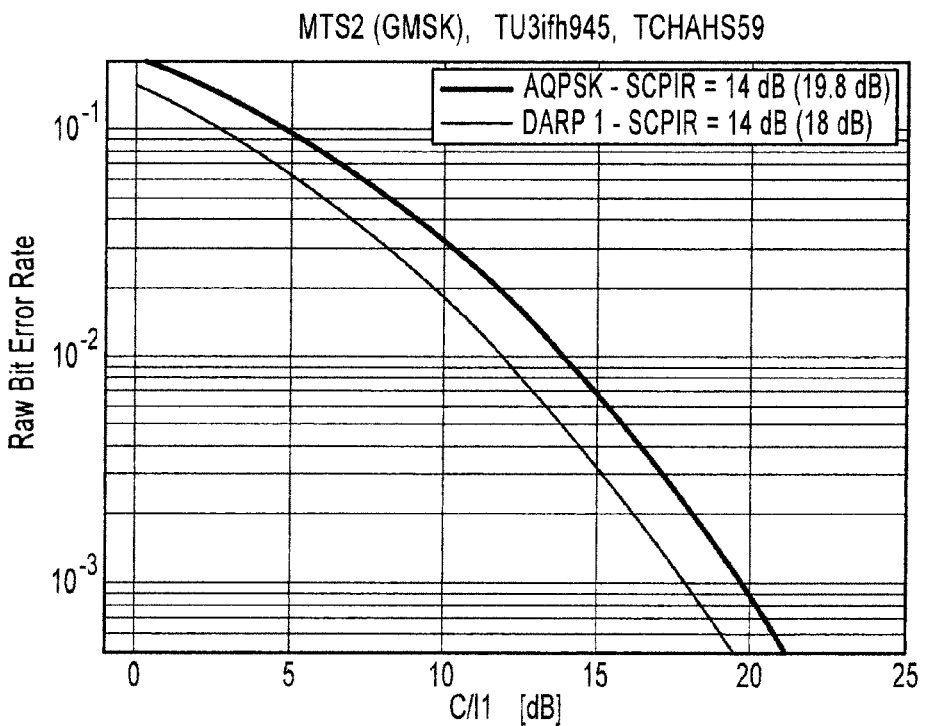
Figure 9C:
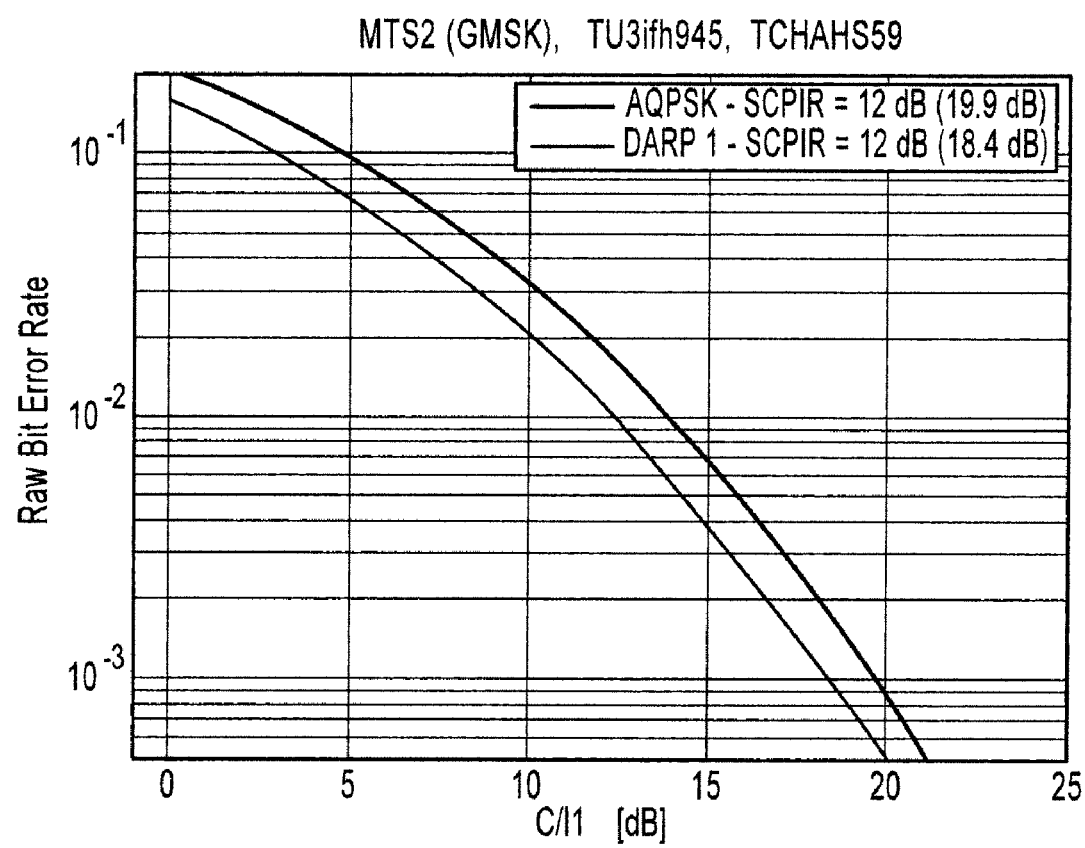

FIGS. 9a-c illustrate the performance of the APQSK receiver and the DARP phase I receiver with multi-interference (MTS2) and GMSK external interference. MTS2 reflects the mixed multi co-channel and adjacent channel interferer scenario. FIG. 9a illustrates the performance of the receivers where the SCPIR is infinity, FIG. 9b illustrates receiver performance with a SCPIR of 14 db, and FIG. 9c illustrates receiver performance with a SCPIR of 12 db.

Figure 10A:
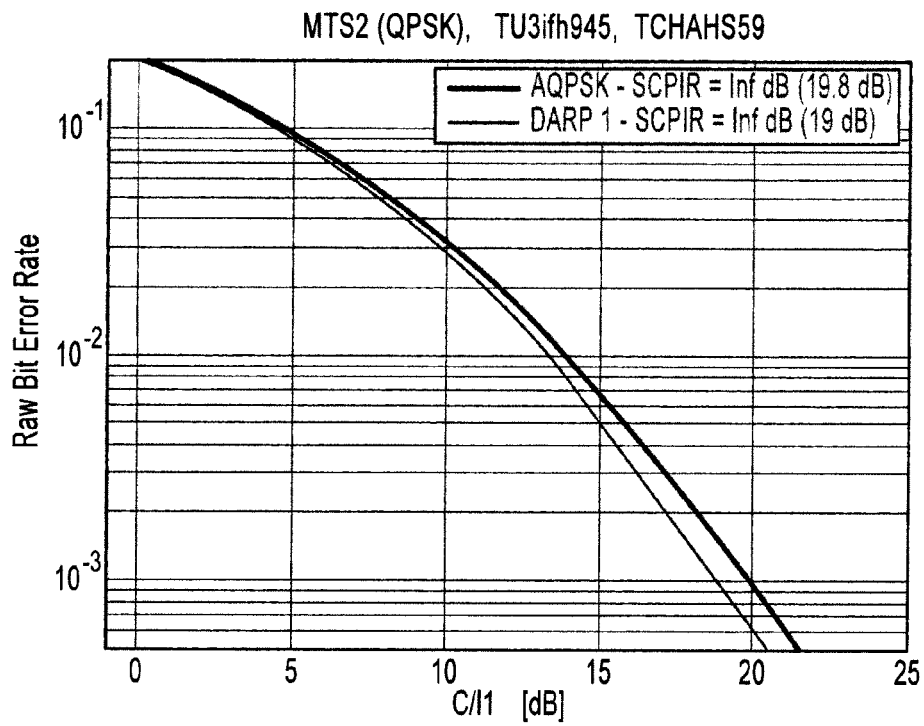
FIGS. 10a-10c illustrate performance curves of receivers for various SCPIR levels with multi-interference (MTS2) and QPSK external interference in accordance with an embodiment.
Figure 10B:
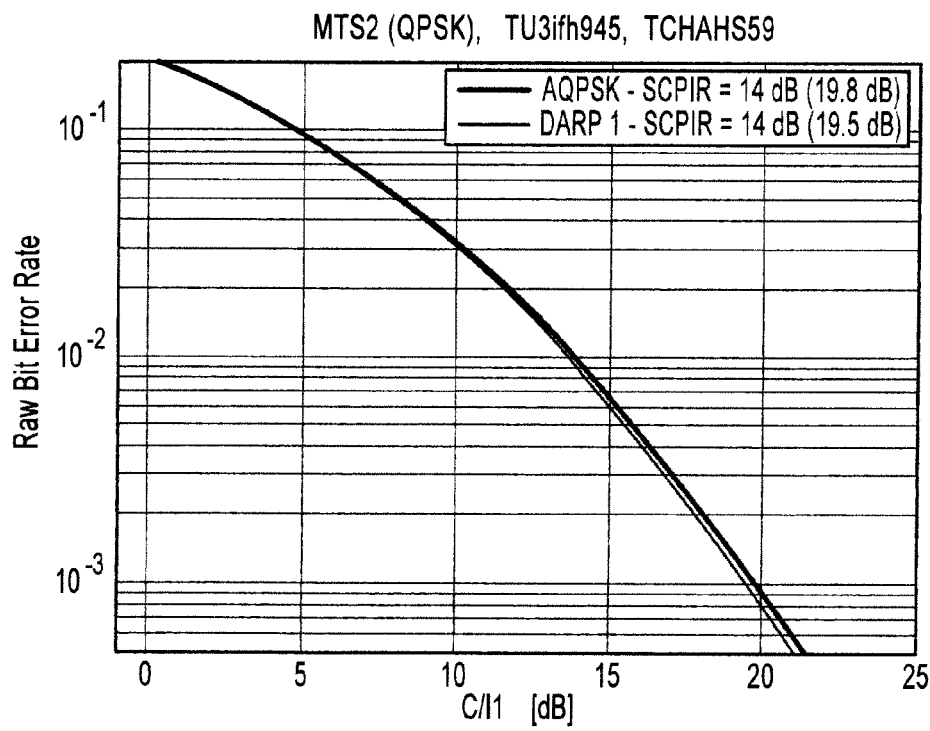
Figure 10C:
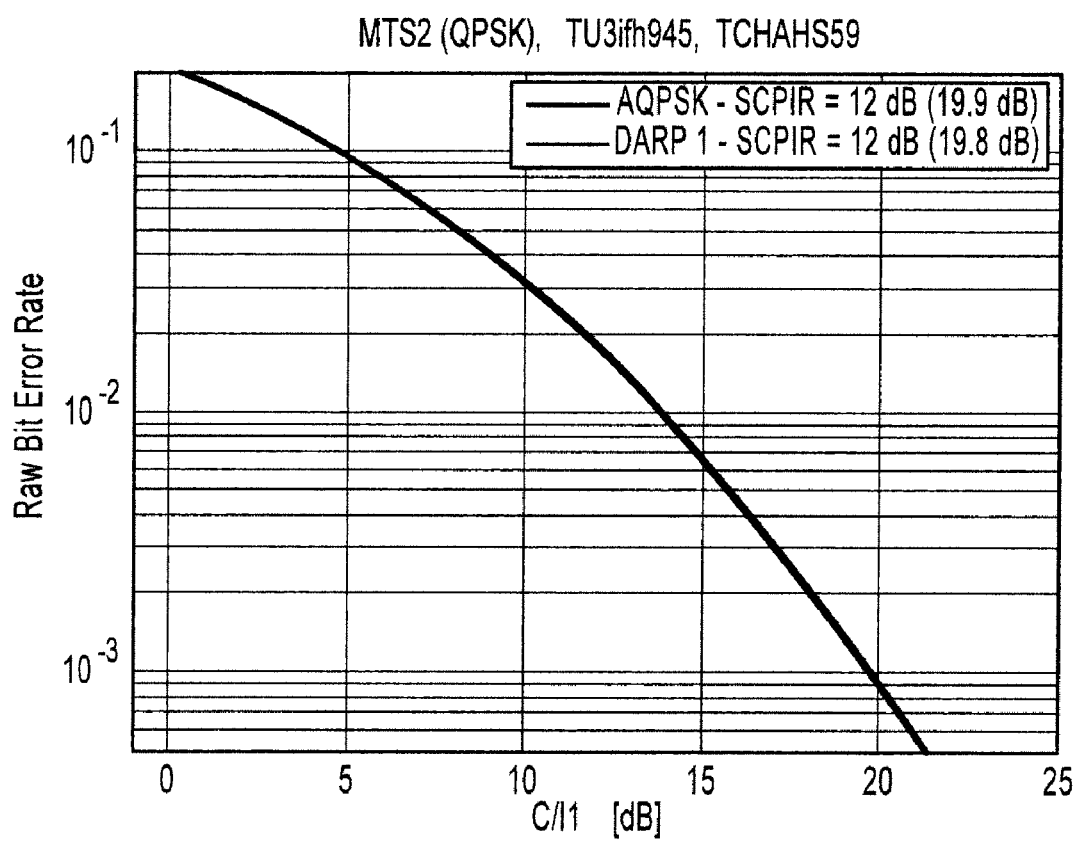

FIGS. 10a-c also illustrate the performance of the APQSK receiver and the DARP phase I receiver with multi-interference (MTS2), but with QPSK external interference. FIG. 10a illustrates the performance of the receivers where the SCPIR is infinity, FIG. 10b illustrates receiver performance with a SCPIR of 14 db, and FIG. 10c illustrates receiver performance with a SCPIR of 12 db.

Figure 11A:
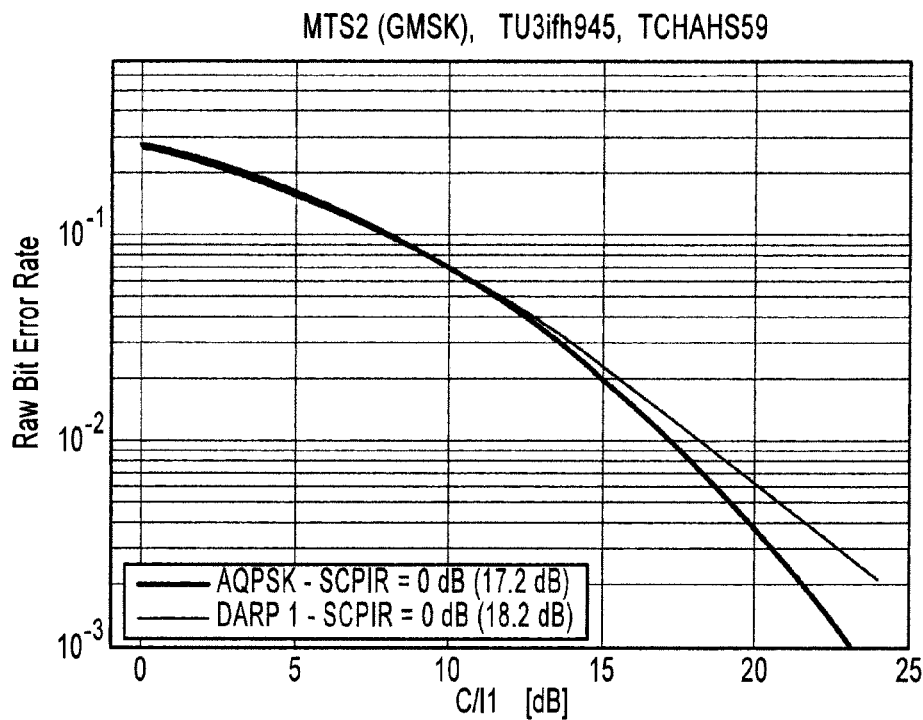
FIGS. 11a-11c illustrate performance curves of receivers for various SCPIR levels with multi-interference (MTS2) and GMSK external interference in accordance with another embodiment.
Figure 11B:
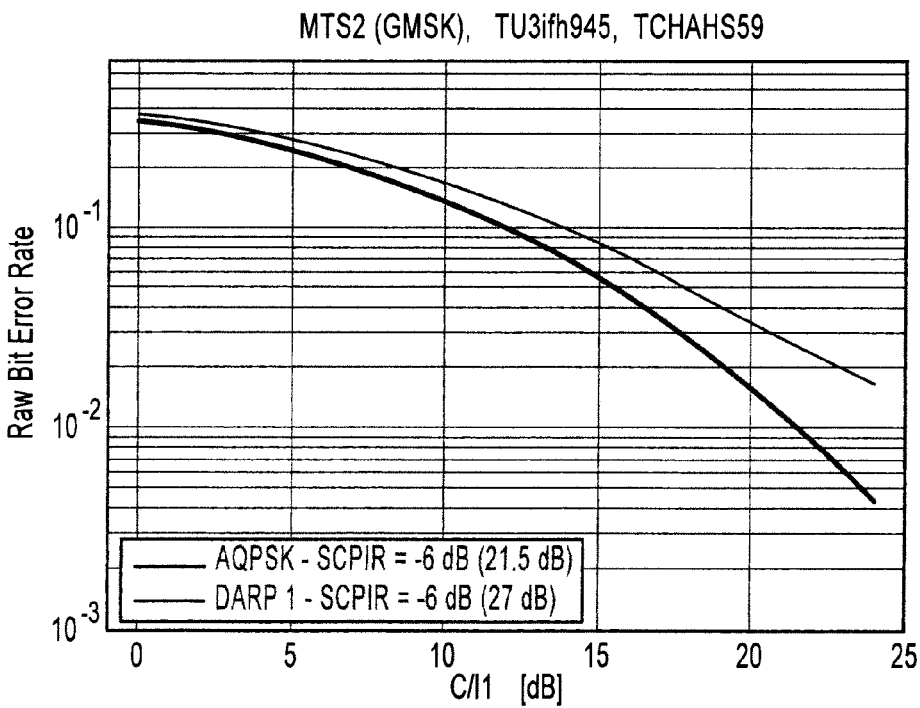
Figure 11C:
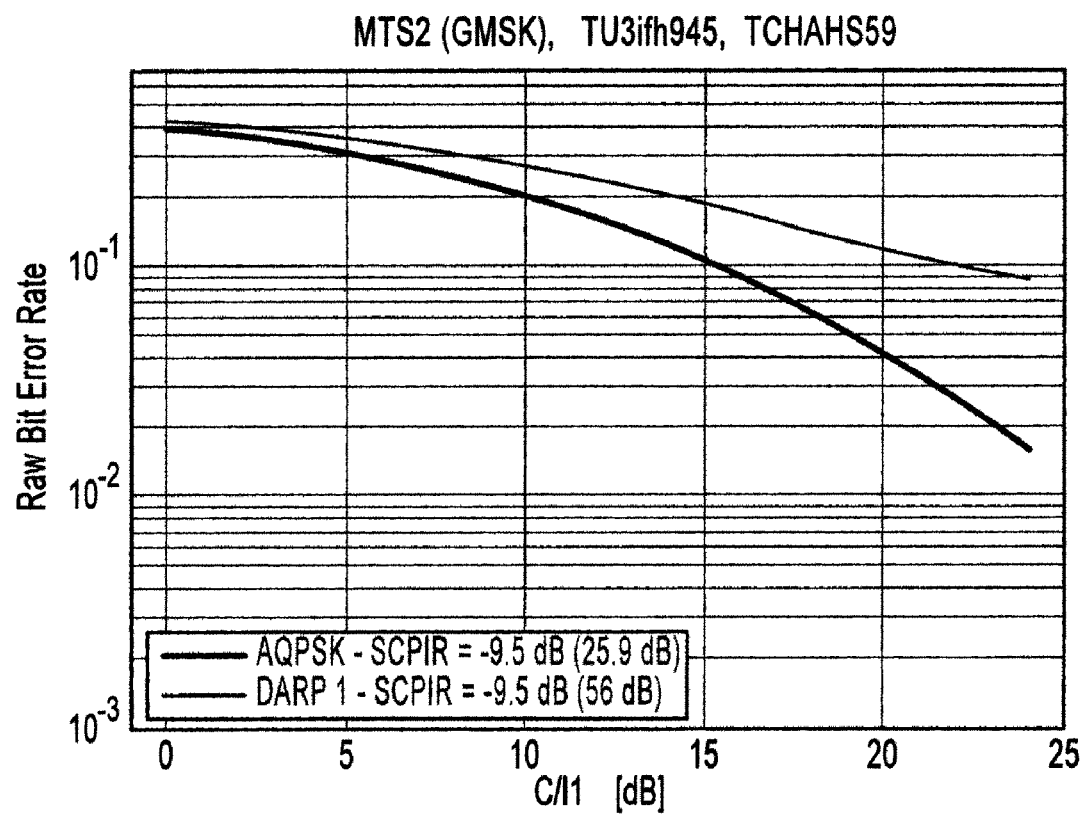

FIGS. 11a-c also illustrate the multi-interference scenario (MTS2) with GMSK external interference. FIG. 11a illustrates the performance of the receivers where the SCPIR is 0 db, FIG. 11b illustrates receiver performance with a SCPIR of −6 db, and FIG. 11c illustrates receiver performance with a SCPIR of −9.5 db.

Figure 12A:
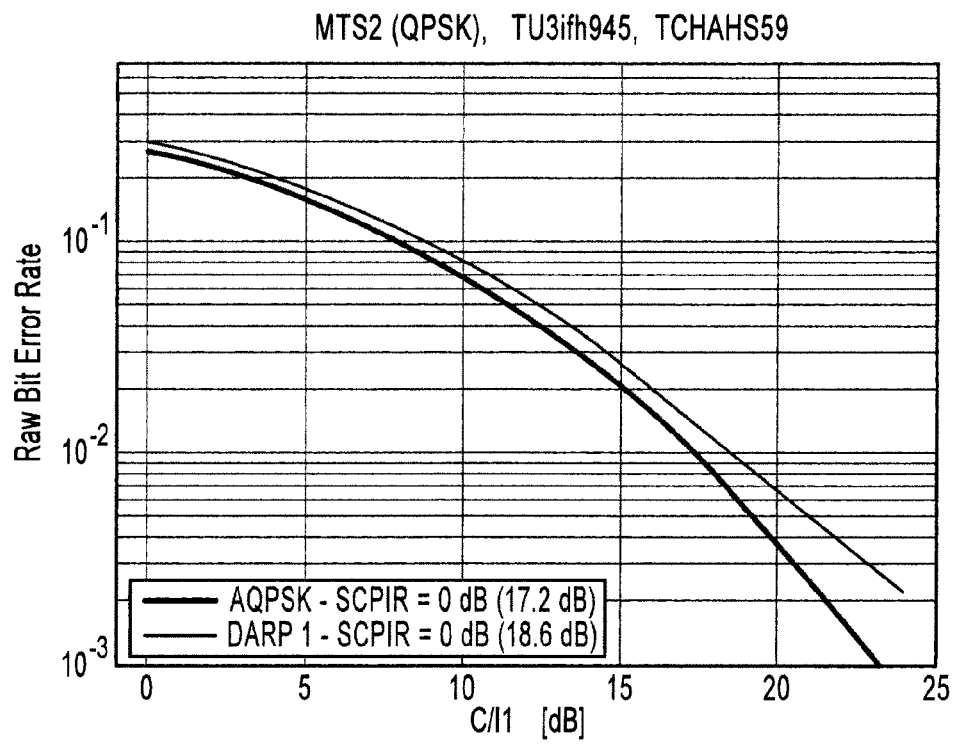
FIGS. 12a-12c illustrate performance curves of receivers for various SCPIR levels with multi-interference (MTS2) and QPSK external interference in accordance with another embodiment.
Figure 12B:
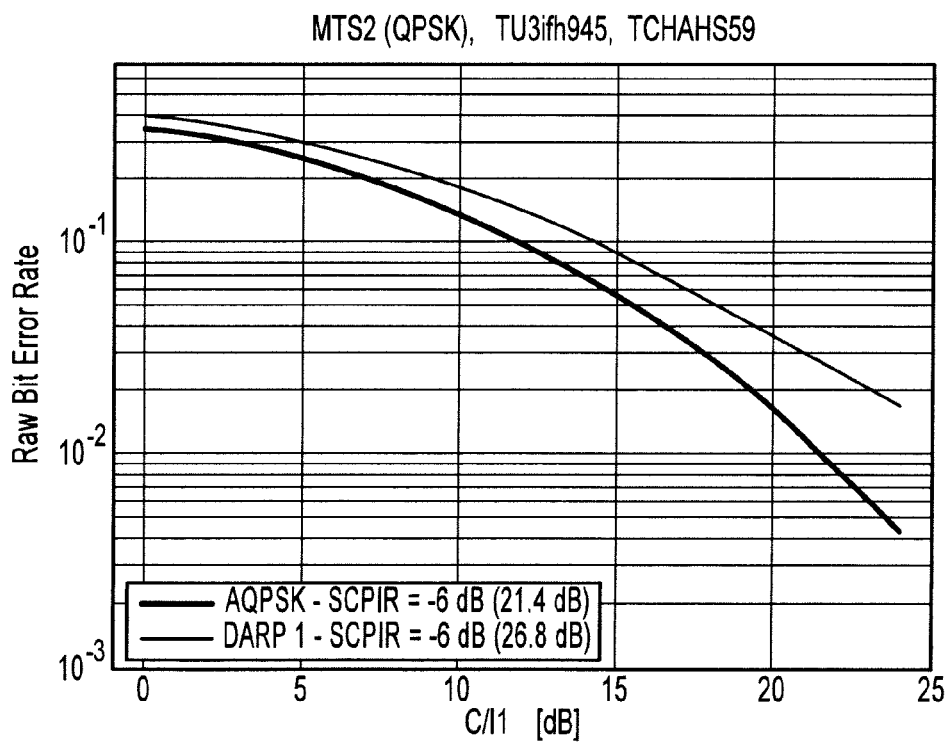
Figure 12C:
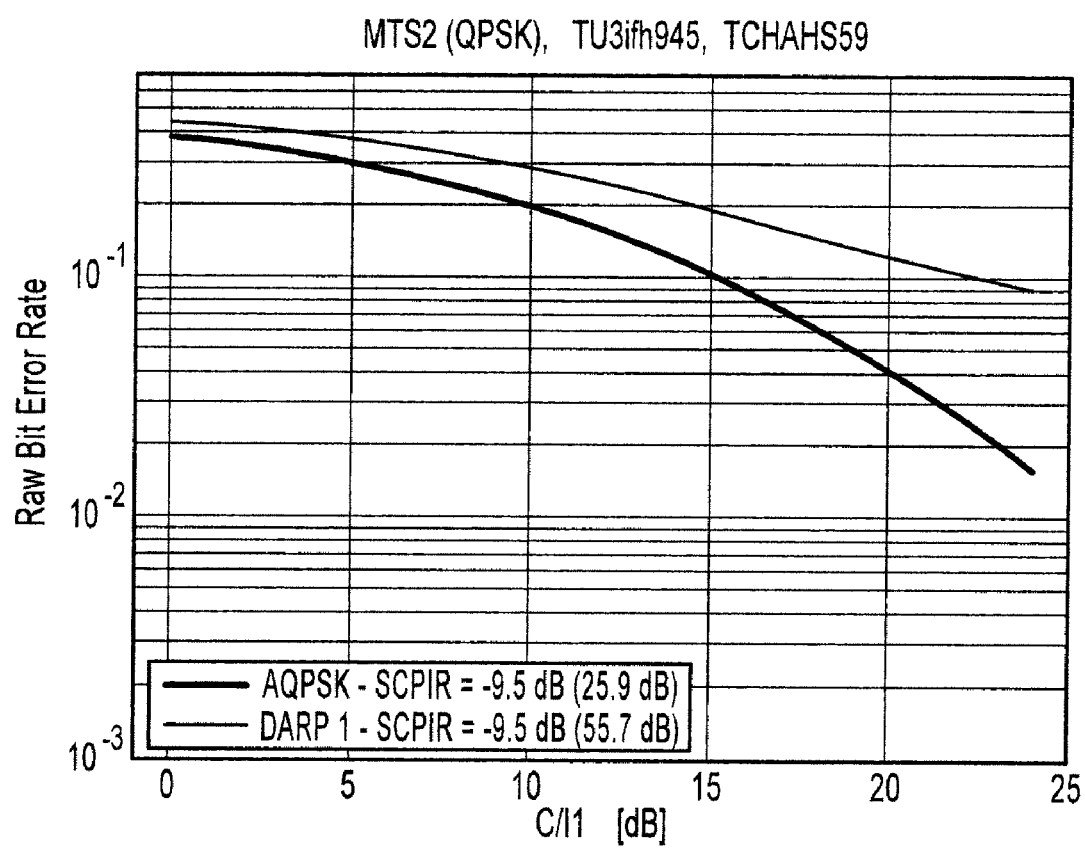

FIGS. 12a-c illustrate the multi-interference scenario (MTS2) with QPSK external interference. FIG. 12a shows the performance of the receivers where the SCPIR is 0 db, FIG. 12b shows receiver performance with a SCPIR of −6 db, and FIG. 12c shows receiver performance with a SCPIR of −9.5 db.

In view of the performance information of the AQPSK (VAMOS level II) receiver and the DARP phase I receiver for the various SCPIR levels, in an embodiment of the invention, the predetermined threshold or value discussed above may be set at between 12 db and 14 db where there is no interference. For example, if the threshold is set to 14 db, then the DARP phase I compliant receiver architecture is selected when the SCPIR is determined to be greater than 14 db. Similarly, according to this example, the VAMOS level II compliant receiver architecture will be selected when the SCPIR is determined to be less than or similar to 14 db. Alternatively, the threshold may be selected to be any value between 12 db and 14 db in accordance with the performance curves illustrated in FIGS. 3 and 4. Further, the threshold may be adjusted to be outside the range of 12 to 14 db for situations where single or multi co-channel interference is present, as shown in FIGS. 5-12. Thus, given the performance information illustrated in FIGS. 3-12, embodiments of the invention can dynamically and accurately switch between receiver architectures to provide optimal performance for all SCPIR levels.

Further, discontinuous transmission (DTX) may have an impact on the performance of a VAMOS level II compliant receiver architecture. In certain embodiments, when one sub-channel user is in DTX, the transmitted signal switches from AQPSk to GMSK. There are two options for the transmitted power to the remaining user: (1) keep the total transmitted power unchanged, allocating all power to the remaining sub-channel user; or (2) reduce the total transmitted power by an amount equal to that of the subchannel user in DTX, as determined by the current SCPIR. Option (1) will boost the reception quality for both VAMOS level I and II terminals, and option (2) will improve performance for a VAMOS level I terminal as it corresponds to the removal of a dominant interferer. Carsten Juncker and Morten With Pedersen have produced a paper entitled "Impact of DTX on VAMOS Level 2 Terminal Performance" (3GPP GERAN WG1 Ad-hoc Meeting, AHG1-090002), which outlines the impact of option (2) on the performance of a VAMOS level II terminal based on joint detection. The subject matter of "Impact of DTX on VAMOS Level 2 Terminal Performance" (3GPP TSG GERAN #43, GP-091214, 7.1.5.10) is hereby incorporated by reference in its entirety. Based on the results of this paper, it is concluded that a VAMOS level II terminal that utilizes the received signal power on both the subchannels in the bit detection process (i.e. joint detection) will experience an improvement in FER performance when the other sub-channel user enters DTX when option 2) is used for the transmitted power to the remaining user. Hence, an improved performance will result for the remaining user regardless of whether option (1) or option (2) is selected for DTX.

It is noted that the performance gain for the remaining subchannel user when the other subchannel user enters DTX depends on the SCPIR. The lower the SCPIR for the remaining user immediately before DTX the larger the gain. The larger the SCPIR for a subchannel user, the closer the performance to SCPIR=∞ and hence the lower the gain from the other subchannel user going into DTX. The abrupt change in the level of total received signal power (leading to a brief decrease in resolution) due to DTX option (2) will not be a problem for the terminal AGC as even a 15 dB decrease in power level will not lead to a significant performance loss until the AGC mechanism has adjusted itself to the reduced power level.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A user equipment, comprising:
at least one processor; and
at least one memory including computer program code,
the at least one memory and the computer program code configured, with the at least one processor, to cause the user equipment at least to
receive speech signals;
determine a subchannel power imbalance ratio of at least two subchannels; and
select a receiver architecture to process the received speech signals in accordance with the determined subchannel power imbalance ratio.

2. The user equipment of claim 1,
wherein the at least one memory and the computer program code are configured, with the at least one processor, to cause the user equipment to
receive said speech signals in bursts, and
perform said determination of the subchannel power imbalance ratio and said selection of the receiver architecture for each of the bursts.

3. The user equipment of claim 1, wherein the at least one memory and the computer program code configured, with the at least one processor, to cause the user equipment to select one of a downlink advanced receiver performance (DARP) phase one compliant receiver architecture and a voice services over adaptive multi-user orthogonal subchannels (VAMOS) level two compliant receiver architecture.

4. The user equipment of claim 3, wherein the at least one memory and the computer program code are configured, with the at least one processor, to cause the user equipment to select the DARP phase one compliant receiver architecture when the subchannel power imbalance ratio is above a predetermined threshold.

5. The user equipment of claim 3, wherein the at least one memory and the computer program code are configured, with the at least one processor, to cause the user equipment to select the VAMOS level two compliant receiver architecture when the subchannel power imbalance ratio is below a predetermined threshold.

6. The user equipment of claim 1, wherein the at least one memory and the computer program code are configured, with the at least one processor, to cause the user equipment to receive the speech signals which comprise voice services over adaptive multi-user orthogonal subchannels (VAMOS) speech signals.

7. The user equipment of claim 1, wherein the at least one memory and the computer program code are configured, with the at least one processor, to cause the user equipment to select one of a Gaussian minimum shift keying (GMSK) receiver architecture and a quadrature phase shift keying (QPSK) receiver architecture.

8. The user equipment of claim 7, wherein the QPSK receiver architecture comprises an alpha-QPSK (AQPSK) receiver architecture.

9. The user equipment of claim 1,
wherein the speech signals comprise speech frames, and
wherein the at least one memory and the computer program code are configured, with the at least one processor, to cause the user equipment to
receive at least one of the speech frames sequentially in bursts,
receive the bursts through different receiver architectures selected according to the determined subchannel imbalance ratio, and
combine the at least one of the speech frames from the bursts received by the different receiver architectures.

10. The user equipment of claim 1, wherein the user equipment comprises a mobile station.

11. The user equipment of claim 1, wherein the at least one memory and the computer program code are configured, with the at least one processor, to cause the user equipment to enable or disable the selection of the receiver architecture based on downlink signaling of voice services over adaptive multi-user orthogonal subchannels (VAMOS) mode in VAMOS capable networks.

12. The user equipment of claim 1, wherein the at least one memory and the computer program code are configured, with the at least one processor, to cause the user equipment to enable or disable the selection of the receiver architecture based on downlink signaling in voice services over adaptive multi-user orthogonal subchannels (VAMOS) indicating a VAMOS capable network during call setup or during a call.

13. A method, comprising:
receiving, at a user equipment speech signals;
determining, at the user equipment, a subchannel power imbalance ratio of at least two subchannels; and
selecting a receiver architecture for processing the speech signals in accordance with the determined subchannel power imbalance ratio.

14. The method of claim 13, wherein said receiving comprises receiving the speech signals in bursts, and wherein said determining and said selecting are performed for each of the bursts.

15. The method of claim 13, wherein the selecting the receiver architecture comprises selecting one of a downlink advanced receiver performance (DARP) phase one compliant receiver architecture and a voice services over adaptive multi-user orthogonal subchannels (VAMOS) level two compliant receiver architecture.

16. The method of claim 15, wherein the selecting the receiver architecture comprises selecting the DARP phase one compliant receiver architecture when the subchannel power imbalance ratio is above a predetermined threshold.

17. The method of claim 15, wherein the selecting the receiver architecture comprises selecting the VAMOS level two compliant receiver architecture when the subchannel power imbalance ratio is below a predetermined threshold.

18. The method of claim 13, wherein the speech signals comprise voice services over adaptive multi-user orthogonal subchannels (VAMOS) speech signals.

19. The method of claim 13, wherein the selecting the receiver architecture comprises selecting one of a Gaussian minimum shift keying (GMSK) receiver architecture and a quadrature phase shift keying (QPSK) receiver architecture.

20. The method of claim 19, wherein the QPSK receiver architecture comprises an alpha-QPSK (AQPSK) receiver architecture.

21. The method of claim 13,
wherein the speech signals comprise speech frames, and at least one of the speech frames are received sequentially in bursts, and
wherein the method further comprises
receiving the bursts through different receiver architectures selected according to the determined subchannel imbalance ratio, and combining the at least one of the speech frames from the bursts received by the different receiver architectures.

22. The method of claim 13, wherein the selecting of the receiver architecture is enabled or disabled based on downlink signaling of voice services over adaptive multi-user orthogonal subchannels (VAMOS) mode in VAMOS capable networks.

23. The method of claim 13, wherein the selecting of the receiver architecture is enabled or disabled based on downlink signaling in voice services over adaptive multi-user orthogonal subchannels (VAMOS) indicating a VAMOS capable network during call setup or during a call.

24. A computer program, embodied on a non-transitory computer readable medium, the computer program configured to control a processor to perform operations comprising:
receiving speech signals;
determining a subchannel power imbalance ratio of at least two subchannels; and
selecting a receiver architecture for processing the speech signals in accordance with the determined subchannel power imbalance ratio.

* * * * *